United States Patent
Sun et al.

(10) Patent No.: US 11,483,854 B2
(45) Date of Patent: Oct. 25, 2022

(54) UPLINK CONTROL INFORMATION SENDING, UPLINK CONTROL INFORMATION RECEIVING METHOD, AND APPARATUS

(71) Applicant: HUAWEI TECHNOLOGIES CO., LTD., Guangdong (CN)

(72) Inventors: Hao Sun, Xi'an (CN); Yongzhao Cao, Shanghai (CN); Hua Li, Shanghai (CN); Ruiqi Zhang, Beijing (CN); Lixia Xue, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 89 days.

(21) Appl. No.: 17/062,208

(22) Filed: Oct. 2, 2020

(65) Prior Publication Data

US 2021/0022165 A1 Jan. 21, 2021

Related U.S. Application Data

(63) Continuation of application No. PCT/CN2019/081350, filed on Apr. 3, 2019.

(30) Foreign Application Priority Data

Apr. 4, 2018 (CN) .......................... 201810300222.3

(51) Int. Cl.
*H04W 72/12* (2009.01)
*H04L 1/18* (2006.01)
*H04L 5/00* (2006.01)

(52) U.S. Cl.
CPC ....... *H04W 72/1284* (2013.01); *H04L 1/1812* (2013.01); *H04L 5/0055* (2013.01); *H04L 5/0057* (2013.01); *H04W 72/1268* (2013.01)

(58) Field of Classification Search
CPC .......... H04W 72/1268; H04W 72/1284; H04L 1/1812; H04L 1/1819; H04L 1/1861;
(Continued)

(56) References Cited

U.S. PATENT DOCUMENTS

| 2011/0128942 A1* | 6/2011 | Kim ...................... H04L 5/0007 370/336 |
| 2011/0299484 A1 | 12/2011 | Nam et al. |

(Continued)

FOREIGN PATENT DOCUMENTS

| CN | 102263617 A | 11/2011 |
| CN | 102934381 A | 2/2013 |

(Continued)

OTHER PUBLICATIONS

U.S. Appl. No. 62/565,170, filed 2019.*

(Continued)

*Primary Examiner* — Dung B Huynh
(74) *Attorney, Agent, or Firm* — Fish & Richardson P.C.

(57) ABSTRACT

This application discloses methods an apparatuses for sending and receiving uplink control information in the field of communications technology. In some implementations, a terminal device may receive first downlink control information (DCI) from a network device; determine, based on the received first DCI, that an uplink shared channel scheduled by using the first DCI is used to send only uplink control information (UCI); and send first UCI to the network device through the uplink shared channel scheduled by using the first DCI. In other words, the network device indicates to the terminal device by using DCI so that the terminal device can determine, based on an indication of the network device, whether the uplink shared channel scheduled by using the DCI is used to send only the UCI.

18 Claims, 6 Drawing Sheets

(58) Field of Classification Search
CPC ... H04L 1/1896; H04L 5/0053; H04L 5/0055; H04L 5/0057
See application file for complete search history.

(56) References Cited

U.S. PATENT DOCUMENTS

| | | | |
|---|---|---|---|
| 2015/0249984 A1* | 9/2015 | Papasakellariou | H04W 72/042 370/329 |
| 2016/0014765 A1 | 1/2016 | Papasakellariou et al. | |
| 2016/0183244 A1* | 6/2016 | Papasakellariou | H04L 5/001 370/329 |
| 2016/0277155 A1 | 9/2016 | Nissil | |
| 2017/0318575 A1* | 11/2017 | Park | H04W 72/0446 |
| 2017/0346762 A1* | 11/2017 | Lapidous | H04L 45/245 |
| 2018/0020429 A1 | 1/2018 | Aiba et al. | |
| 2018/0123744 A1* | 5/2018 | Nogami | H04L 1/1854 |
| 2018/0310257 A1* | 10/2018 | Papasakellariou | H04W 52/50 |
| 2019/0037586 A1* | 1/2019 | Park | H04L 1/0031 |
| 2019/0053097 A1* | 2/2019 | Rico Alvarino | H04L 1/0073 |
| 2019/0059013 A1* | 2/2019 | Rahman | H04L 5/0057 |
| 2019/0109626 A1* | 4/2019 | Park | H04B 7/0621 |
| 2019/0116588 A1* | 4/2019 | Xiong | H04L 5/0057 |
| 2019/0141677 A1* | 5/2019 | Harrison | H04L 5/0082 |
| 2019/0149291 A1* | 5/2019 | Xiong | H04L 5/0048 370/329 |
| 2019/0215781 A1* | 7/2019 | Jeon | H04W 24/10 |
| 2019/0215823 A1* | 7/2019 | Kim | H04L 5/0094 |
| 2019/0215897 A1* | 7/2019 | Babaei | H04W 76/38 |
| 2019/0223205 A1* | 7/2019 | Papasakellariou | H04L 5/0057 |
| 2019/0230688 A1* | 7/2019 | Huang | H04W 72/14 |
| 2020/0120642 A1* | 4/2020 | Hwang | H04L 5/005 |
| 2020/0177324 A1* | 6/2020 | Moision | H04L 1/1864 |
| 2020/0236673 A1* | 7/2020 | Xu | H04L 1/1812 |
| 2020/0288458 A1* | 9/2020 | Takeda | H04L 5/0055 |
| 2021/0022165 A1* | 1/2021 | Sun | H04L 1/1664 |
| 2021/0058922 A1* | 2/2021 | Han | H04L 5/0055 |
| 2021/0176028 A1* | 6/2021 | Zhou | H04L 1/1893 |
| 2021/0211232 A1* | 7/2021 | Hwang | H04L 5/00 |
| 2021/0274493 A1* | 9/2021 | Papasakellariou | H04L 1/1671 |
| 2021/0400698 A1* | 12/2021 | Wu | H04L 1/0057 |
| 2022/0039088 A1* | 2/2022 | Zhang | H04L 1/0002 |

FOREIGN PATENT DOCUMENTS

| | | |
|---|---|---|
| CN | 103095398 A | 5/2013 |
| CN | 104685916 A | 6/2015 |
| CN | 105917608 A | 8/2016 |
| CN | 106416389 A | 2/2017 |
| CN | 107210857 A | 9/2017 |
| CN | 107211306 A | 9/2017 |
| CN | 107801246 A | 3/2018 |
| EP | 2577897 A2 | 4/2013 |
| JP | 2013527729 A | 6/2013 |
| JP | 2015146600 A | 8/2015 |
| WO | 2011152673 A2 | 12/2011 |
| WO | 2016115491 A1 | 7/2016 |
| WO | 2017049645 A1 | 3/2017 |
| WO | 2017052251 A1 | 3/2017 |
| WO | 2017083651 A1 | 5/2017 |
| WO | 2018038758 A1 | 3/2018 |

OTHER PUBLICATIONS

U.S. Appl. No. 62/619,648, filed 2018.*
U.S. Appl. No. 62/621,577, filed 2019.*
3GPP TS 38.214 v15.0.0 (Dec. 2017), "3rd Generation Partnership Project; Technical Specification Group Radio Access Network; NR; Physical layer procedures for data (Release 15)", Dec. 2017, 71 pages.
Extended European Search Report in European Application No. 19781222.5, dated Mar. 15, 2021, 18 pages.
Office Action issued in Japanese Application No. 2020-554095 dated Nov. 16, 2021, 7 pages (with English translation).
3GPP TS 38.211 V15.1.0 (Mar. 2018); "3rd Generation Partnership Project;Technical Specification Group Radio Access Network;NR;Physical channels and modulation(Release 15)," Mar. 2018, 90 pages.
3GPP TS 38.212 V15.0.0 (Dec. 2017), "3rd Generation Partnership Project;Technical Specification Group Radio Access Network;NR;Multiplexing and channel coding (Release 15)," Dec. 2017, 82 pages.
3GPP TS 38.213 V15.0.0 (Dec. 2017), "3rd Generation Partnership Project;Technical Specification Group Radio Access Network;NR;Physical layer procedures for control (Release 15)," Dec. 2017, 56 pages.
3GPP TS 38.331 V15.1.0 (Mar. 2018),"3rd Generation Partnership Project;Technical Specification Group Radio Access Network; NR;Radio Resource Control (RRC) protocol specification(Release 15)," Mar. 2018, 268 pages.
Catt, "Remaining details of UCI multiplexing on PUSCH," 3GPP TSG RAN WG1 Meeting #92, R1-1801733, Athens, Greece, Feb. 26-Mar. 2, 2018, 5 pages.
Huawei, HiSilicon, "Remaining issues on UCI multiplexing," 3GPP TSG RAN WG1 Meeting #92, R1-1803257, Athens, Greece, Feb. 26-Mar. 2, 2018, 8 pages.
Intel Corporation, "UCI on PUSCH," 3GPP TSG RAN WG1 Meeting #92, R1-1802412, Athens, Greece, Feb. 26-Mar. 2, 2018, 8 pages.
LG Electronics, "Remaining issues on UCI multiplexing," 3GPP TSG RAN WG1 Meeting #92, R1-1802212, Athens, Greece, Feb. 26-Mar. 2, 2018, 9 pages.
Office Action issued in Chinese Application No. 201910785162.3 dated Apr. 26, 2020, 5 pages.
Office Action issued in Chinese Application No. 201910789991.9 dated Apr. 16, 2020, 5 pages.
Office Action issued in Chinese Application No. 201910789991.9 dated Jun. 22, 2020, 4 pages.
Office Action issued in Chinese Application No. 201910785162.3 dated Jun. 2, 2020, 4 pages.
Office Action issued in Chinese Application No. 201810300222.3 dated Sep. 11, 2020, 6 pages.
PCT International Search Report and Written Opinion issued in International Application No. PCT/CN2019/081350 dated Jun. 19, 2019, 17 pages (with English translation).
Qualcomm Incorporated, "Remaining issues for multiplexing UCI on PUSCH," 3GPP TSG RAN WG1 Meeting #92, R1-1802839, Athens, Greece, Feb. 26-Mar. 2, 2018, 13 pages.
Samsung, "Corrections on UCI Multiplexing in PUSCH," 3GPP TSG RAN WG1 #AH 1801, R1-1800449, Vancouver, Canada, Jan. 22-26, 2018, 16 pages.
Office Action issued in Indian Application No. 202037043661 dated Dec. 3, 2021, 8 pages.

* cited by examiner

UPLINK CONTROL INFORMATION SENDING, UPLINK CONTROL INFORMATION RECEIVING METHOD, AND APPARATUS

CROSS-REFERENCE TO RELATED APPLICATIONS

This application is a continuation of International Application No. PCT/CN2019/081350, filed on Apr. 3, 2019, which claims priority to Chinese Patent Application No. 201810300222.3, filed on Apr. 4, 2018. The disclosures of the aforementioned applications are hereby incorporated by reference in their entireties.

TECHNICAL FIELD

This application relates to the field of communications technologies, and in particular, to an uplink control information sending, an uplink control information receiving method, and an apparatus.

BACKGROUND

During wireless communication, a terminal device may send uplink shared channel (UL-SCH) data to a network device and may also send control information to the network device.

Usually, the terminal device may send only uplink control information or both data and uplink control information to the network device through a physical uplink shared channel (PUSCH). However, the terminal device cannot currently determine to specifically send only the uplink control information or both the data and the uplink control information.

SUMMARY

Embodiments of this application provide an uplink control information sending, an uplink control information receiving method, and an apparatus, so as to provide a manner of determining that an uplink shared channel scheduled by a network device is used to send only uplink control information.

According to a first aspect, an uplink control information sending method is provided. In the method, a terminal device receives first DCI from a network device, where the first DCI is used to schedule an uplink shared channel; then, the terminal device determines, based on the first DCI, that the uplink shared channel is used to send only UCI; and finally, the terminal device sends first UCI to the network device through the uplink shared channel.

A case in which only the UCI is sent through the uplink shared channel is referred to as UCI-only. In the foregoing technical solution, the terminal device may directly determine, based on DCI sent by the network device, whether the uplink shared channel scheduled by using the DCI is UCI-only, thereby providing a determining manner in which the terminal device determines whether the uplink shared channel scheduled by the network device is UCI-only. The determining manner is a simple determining manner provided based on existing control information such as the DCI, and directly uses an existing signaling mode without increasing additional overheads. This can save transmission resources, and also can ensure a consistent understanding between the terminal device and the network device, thereby improving performance of interaction between the terminal device and the network device.

To support UCI-only determining based on the DCI, indication information used to indicate UCI-only may be added to the DCI. For example, the indication information is referred to as UCI-only indication information. After obtaining the DCI, the terminal device may obtain the UCI-only indication information, and then determine, based on the UCI-only indication information, whether the uplink shared channel is UCI-only.

In a possible design, the terminal device may explicitly determine UCI-only based on information carried in the DCI. In another possible design, the terminal device may implicitly determine UCI-only based on information carried in the DCI.

In the explicit determining manner, based on the existing DCI, an extra bit field is added at a predetermined location in an existing DCI format, to carry the UCI-only indication information. The terminal device may directly determine UCI-only based on the UCI-only indication information at the predetermined location, without performing an additional calculation process. This is convenient and fast.

In the implicit determining manner, some parameters originally included in the DCI are used to implicitly indicate UCI-only. No additional modification needs to be made to the DCI, and there is a small modification to an existing standard. Optionally, when a value combination of two parameters in the DCI is an impossible combination in currently existing function combinations, that is, the value combination of the two parameters used to implicitly indicate UCI-only is not an existing function combination, for example, when the value combination of the two parameters represents two conflicting indications related to new data transmission and data retransmission, UCI-only is determined. New transmission and retransmission are not used to actually indicate new data transmission and data retransmission, in other words, the terminal device does not transmit new data or retransmit data based on the indications. In this solution, the indication combination that is impossible in the prior art is merely used to implicitly indicate UCI-only, that is, a different value combination of parameters is used to implement a new indication function.

In a possible design, an NDI and an RV that are in the DCI are used to determine UCI-only. When NDI flipping occurs, it indicates new data transmission, and when a value of the RV is a specific value (for example, 1 or 2), it indicates data retransmission. Therefore, a combination of the NDI and the RV may be used to represent conflicting indications of new data transmission and data retransmission. Then, coexistence of the two conflicting indications that is impossible in a current normal case is used to implicitly indicate UCI-only.

In a possible design, an NDI and $I_{MCS}$ that are in the DCI are used to determine UCI-only. As described above, on a basis that new data transmission is indicated through NDI flipping, when $I_{MCS}$ is a predetermined value, it indicates data retransmission. Then, coexistence of the two conflicting indications that is usually impossible in a normal case is used to implicitly indicate UCI-only.

To determine, based on the NDI, whether new data is transmitted, whether NDI flipping occurs needs to be determined first. To determine whether NDI flipping occurs, values of NDIs in two pieces of DCI are needed. One piece of DCI is the currently received DCI, that is, the first DCI; and the other piece of DCI is previous DCI that carries the same HARQ process number as the first DCI and that is closest to the first DCI in time. For ease of description, the other piece of DCI is referred to as second DCI in this design. Because the second DCI is a previous DCI received before the first DCI, the second DCI may be received by the terminal device before the first DCI is received. Further, whether a value of an NDI in the first DCI is the same as a value of an NDI in the second DCI may be compared to determine whether NDI flipping occurs. If the values of the two NDIs are the same, no NDI flipping occurs; or if the values of the two NDIs are different, it indicates that NDI flipping occurs.

In a possible design, when a value of $I_{MCS}$ belongs to a set including index values indicating a highest modulation order in an MCS table, $I_{MCS}$ may be used to indicate data retransmission. In a normal case, highest-order modulation is usually not used during retransmission and a plurality of retransmissions, that is, highest-order modulation is usually not used for retransmission in a current regular case. Therefore, in this design, a non-regular case in which $I_{MCS}$ is an index value indicating a highest modulation order is used to indicate data retransmission, so that the data retransmission indication and the new data transmission indication represented through NDI flipping form two conflicting indications, to indicate UCI-only. In addition, based on several different existing MCS tables, there may be different sets including the index values indicating the highest modulation order in this design. For example, several sets include {17, 18, 19, 20, 21, 22, 23, 24, 25, 26, 27, 28, 31}, {20, 21, 22, 23, 24, 25, 26, 27, 31}, and {17, 18, 19, 20, 21, 22, 23, 24, 25, 26, 27, 31}.

In a possible design, a function combination that does not exist currently and that includes NDI flipping and a condition that a value of $I_{MCS}$ is greater than or equal to a predetermined value may be alternatively used to indicate UCI-only. The predetermined value may be a relatively large index value in an existing MCS table, for example, 30 or 31 (for example, a largest index value). In this design, for example, $I_{MCS} \in \{28, 29, 30, 31\}$ or $I_{MCS} \in \{29, 30, 31\}$. Because corresponding code rates are not set for index values 28, 29, 30, and 31, or index values 29, 30, and 31 in the existing MCS tables, in a current normal case, these index values are usually not used to indicate new data transmission. Based on this, the index values for which the corresponding code rates are not set currently are used to indicate data retransmission. Further, the data retransmission indication and the new data transmission indication represented through NDI flipping form two conflicting indications, to indicate UCI-only.

In a possible design, a combination of an NDI, an RV, and $I_{MCS}$ may be alternatively used to determine UCI-only. In practice, whether NDI flipping occurs may be wrongly determined, for example, NDI flipping is wrongly determined as no NDI flipping. Based on this, a determining condition of $I_{MCS}$ is added. The manner of adding the determining condition can avoid a case in which UCI-only is inaccurately indicated and even cannot be indicated due to wrong determining, thereby improving determining accuracy.

In a possible design, a combination of an NDI, an RV, and a HARQ process number may be alternatively used to determine UCI-only. In this design, adding a determining condition of the HARQ process number can also improve UCI-only determining accuracy, thereby reducing and even eliminating impact caused by NDI wrong determining. In the newly added determining condition, a value of the HARQ process number may be 14 or 15. Because a HARQ process number having a relatively large value such as 15 or 14 is usually not used in a normal case, a currently impossible parameter combination in which the RV indicates data retransmission and the HARQ process number is 15 or 14 is used to indicate UCI-only. This can ensure UCI-only determining accuracy when the NDI cannot work due to wrong determining. Moreover, because the HARQ process number of 14 or 15 is rarely used in the normal case, even some wrong determining may not affect normal running of a HARQ.

After UCI-only is determined, a lookup may be performed in an MCS table by using the MCS index (that is, $I_{MCS}$) in the DCI, to obtain a corresponding code rate (which is referred to as a first code rate) and a modulation order. Then, the UCI is sent by using the obtained first code rate and modulation order.

In a possible design, a lookup is performed in a currently existing MCS table by directly using $I_{MCS}$ in the DCI, to obtain a first code rate and a modulation order that correspond to $I_{MCS}$.

In a possible design, a new index value is created by using all bits indicating the HARQ process number and some of all bits indicating $I_{MCS}$, and then the new index value is used to perform a lookup in an MCS table, to obtain a corresponding first code rate and modulation order. Compared with table lookup by directly using $I_{MCS}$ in the DCI, the solution in this design is more flexible, and can avoid a case in which a corresponding code rate cannot be obtained through table lookup by directly using $I_{MCS}$ in the DCI, for example, when a value of a code rate that is in an MCS table and that corresponds to an index value is "reserved", thereby enhancing applicability of the solution.

In a possible design, a 5-bit bit field is created based on all bits (that is, four bits) in the HARQ process number and one bit in $I_{MCS}$; then, a value indicated by the created bit field is used as a new index value; and finally, the new index value is used for table lookup, to obtain a corresponding first code rate and modulation order.

In a possible design, one least significant bit in $I_{MCS}$ may be used, because directly using the least significant bit in $I_{MCS}$ is relatively convenient, and a value of the least significant bit in $I_{MCS}$ has relatively small impact on the value of $I_{MCS}$. Moreover, the one least significant bit is placed after or before the four bits in the HARQ process number, that is, the one least significant bit in $I_{MCS}$ is used as a least significant bit or a most significant bit in the created five bits. In this way, there is a relatively small modification to a structure of 4 bits in the HARQ process number.

In some possible designs, regardless of which table lookup manner is used for table lookup, both a first code rate and a modulation order may be obtained through table lookup. Further, quantities of REs that are used to send parts of the UCI may be calculated according to the following formulas. Optionally, the UCI may include three parts: a HARQ ACK, a CSI-part1, and a CSI-part2.

In a possible design, quantities of REs that are used to send the HARQ ACK, the CSI-part1, and the CSI-part2 may be calculated according to the following three formulas, respectively. $Q'_{ACK}$, $Q_{CSI-1}$, and $Q_{CSI-2}$ represent the quantity of the REs used to send the HARQ ACK, the quantity of the REs used to send the CSI-part1, and the quantity of the REs used to send the CSI-part2, respectively.

$$Q'_{ACK} = \min\left\{\left\lceil\frac{(O_{ACK} + L_{ACK}) \cdot \beta^{ACK}_{offset}}{\gamma_{ref} \cdot Q_m}\right\rceil, \sum_{l=0}^{N^{PUSCH}_{symb,all}-1} M^{UCI}_{sc}(l)\right\},$$

$$Q'_{CSI-1} = \min\left\{ \left\lceil \frac{(O_{CSI-1} + L_{CSI-1}) \cdot \beta_{offset}^{CSI-part1}}{\gamma_{ref} \cdot Q_m} \right\rceil, \sum_{l=0}^{N_{symb,all}^{PUSCH}-1} M_{sc}^{UCI}(l) - Q'_{ACK} \right\}, \text{ and}$$

$$Q'_{CSI-2} = \sum_{l=0}^{N_{symb,all}^{PUSCH}-1} M_{sc}^{UCI}(l) - Q'_{CSI-1} - Q'_{ACK},$$

where $\gamma_{ref}$ represents a first code rate obtained through table lookup, $Q_m$ represents a modulation order obtained through table lookup, and $$\sum_{l=0}^{N_{symb,all}^{PUSCH}-1} M_{sc}^{UCI}(l)$$

represents a quantity of all REs on the PUSCH, that is, a total quantity of REs that are allocated by the network device to the PUSCH; $O_{CSI-2-ref}$ represents a reference payload size of the CSI-part2, and $L_{CSI-2-ref}$ represents a corresponding quantity of CRC bits; and $O_{CSI-1}$ represents a payload size of the CSI-part1, and $L_{CSI-1}$ represents a corresponding quantity of CRC bits. $O_{CSI-1}+L_{CSI-1}$ may be understood as a total payload size of the CSI-part1, and $O_{CSI-2-ref}+L_{CSI-2-ref}$ may be understood as a total reference payload size of the CSI-part2. $\beta_{offset}^{CSI-part1}$ and $\beta_{offset}^{CSI-part2}$ represent code rate compensation parameters of the CSI-part1 and the CSI-part2, respectively, and are semi-statically preconfigured by a wireless higher layer of the network device or dynamically indicated by using the DCI subsequently.

In addition, a min {,} function in the formula means that a value of a parameter on the left of "=" is the smaller one of two values included in the min function.

In a possible design, after the quantities of REs that are used to send the parts included in the UCI are obtained, the first code rate and the modulation order obtained through table lookup may be directly used to send corresponding information to the network device.

In another possible design, another code rate may be generated first based on the first code rate, that is, the another code rate is obtained through code rate conversion on the first code rate, and then the another code rate, the corresponding quantity of REs, and the modulation order are used to send information about the corresponding part. For example, a second code rate is generated based on the first code rate, or a third code rate is generated based on the first code rate. Then, the first code rate, or the second code rate, or the first code rate and the third code rate, or the second code rate and the third code rate is/are used to send information about the corresponding part in the UCI.

In a possible design, code rate conversion may be performed according to the following formulas, where $\gamma_{ref}$ represents the first code rate obtained through table lookup, $\gamma_{CSI-1}$ represents the second code rate obtained by performing code rate conversion based on the first code rate, and $C_T$ represents the third code rate obtained by performing code rate conversion on the first code rate:

$$\gamma_{CSI-1} = \frac{\gamma_{ref}}{\beta_{offset}^{CSI-part1}},$$

$$C_T = \frac{\beta_{offset}^{CSI-part1}}{\beta_{offset}^{CSI-part2}} \cdot \gamma_{CSI-1}, \text{ and}$$

$$C_T = \frac{\gamma_{ref}}{\beta_{offset}^{CSI-part2}}.$$

In a possible design, the second code rate is a code rate used to send the CSI-part1 in the UCI, the third code rate is a threshold code rate, and the threshold code rate restricts a code rate of the CSI-part2 to be not higher than the threshold code rate. If the code rate of the CSI-part2 is higher than the threshold code rate, some information in the CSI-part2 may be dropped based on a priority.

Performing specific code rate conversion can make code rate determining more flexible, and a code rate obtained through code rate conversion may be used to send the UCI, instead of using the first code rate, obtained through a direct lookup in an MCS table, to send the UCI. This can improve accuracy of scheduling by the network device.

According to a second aspect, a UCI receiving method is provided. In the method, a network device first sends first downlink control information DCI to a terminal device, where the first DCI is used to schedule an uplink shared channel, and is used to indicate that the uplink shared channel is used to send only UCI; and then, may receive first UCI sent by the terminal device through the uplink shared channel.

Before sending the first DCI to the terminal device, the network device may determine that the uplink shared channel scheduled for the terminal device is used to send only the UCI, and then generate the first DCI based on the foregoing determining result.

In the solution, the network device may notify, by using the UCI, the terminal device of an indication that the uplink shared channel scheduled for the terminal device is used to send only the UCI. This can enhance a capability of the network device to control and indicate to the terminal device, so that the terminal device can have a consistent understanding as the network device, thereby improving performance of interaction between the network device and the terminal device.

In a possible design, the network device may further send second DCI to the terminal device, and when a value of an NDI included in the first DCI is different from a value of an NDI included in the second DCI, an RV is 1 or 2, and an MCS index is 28, 29, 30, 31, or any one of indexes indicating a highest modulation order in an MCS table, indicate that the uplink shared channel is used to send only the UCI. In other words, the network device may indicate UCI-only to the terminal device by using a value combination of the foregoing parameters. The second DCI is a previous DCI received before the first DCI, the second DCI includes a HARQ process number, and the first DCI includes the NDI, the RV, the HARQ process number, and $I_{MCS}$.

In a possible design, the first DCI includes the HARQ process number and the MCS index, and the HARQ process number and the MCS index may be used to indicate a first code rate. In other words, the network device may indicate the first code rate to the terminal device by using the HARQ process number and the MCS index. For example, the network device may add the HARQ process number and the MCS index to the first DCI; and the terminal device may obtain the HARQ process number and the MCS index after receiving the first DCI, and then determine the first code rate based on the obtained HARQ process number and MCS index.

In a possible design, the network device may receive the first UCI sent by the terminal device by using the first code rate, or the network device receives the first UCI sent by the terminal device by using a second code rate, or the network device receives the first UCI sent by the terminal device by using the first code rate and a third code rate, or the network device receives the first UCI sent by the terminal device by using a second code rate and a third code rate, where both the second code rate and the third code rate are determined based on the first code rate.

In a possible design, the network device indicates the first code rate based on all bits in the HARQ process number and some of all bits in the MCS index. In other words, all the bits in the existing HARQ process number are directly used. In this way, a structure of four bits included in the HARQ process number does not need to be modified.

In a possible design, some of all the bits in the MCS index include one bit in all the bits in the MCS index. In other words, the network device may indicate the first code rate based on all the bits in the HARQ process number and the one bit in the MCS index. For example, the one bit in the MCS index may be a least significant bit of all the bits in the MCS index, or may be another bit; and the one bit in the MCS index may be placed before or after the four bits in the HARQ process number, so that the one bit in the MCS index can act as a most significant bit or a least significant bit of a finally constructed five bits.

In a possible design, the network device may further send second DCI to the terminal device, and when a value of an NDI included in the first DCI is different from a value of an NDI included in the second DCI, an RV is 1 or 2, and a HARQ process number is 14 or 15, indicate that the uplink shared channel is used to send only the UCI. In other words, the network device may indicate UCI-only to the terminal device by using a value combination of the foregoing parameters. The second DCI is a previous DCI received before the first DCI, the second DCI includes the HARQ process number, and the first DCI includes the NDI, the RV, and the HARQ process number.

The method in the second aspect corresponds to the method in the first aspect. Therefore, for the descriptions of the method in the second aspect, refer to the descriptions of the method in the first aspect.

According to a third aspect, an apparatus is provided. The apparatus may be a terminal device, or may be an apparatus in a terminal device. The apparatus may include a receiving module, a first determining module, and a sending module. The modules may perform corresponding functions performed by the terminal device in any design example in the first aspect.

Specifically, the receiving module is configured to receive first DCI from a network device, where the first DCI is used to schedule an uplink shared channel.

The first determining module is configured to determine, based on the first DCI, that the uplink shared channel is used to send only UCI.

The sending module is configured to send first UCI to the network device through the uplink shared channel.

According to a fourth aspect, an apparatus is provided. The apparatus may be a network device, or may be an apparatus in a network device. The apparatus may include a sending module and a receiving module. The modules may perform corresponding functions performed by the network device in any design example in the second aspect.

Specifically, the sending module is configured to send first DCI to a terminal device, where the first DCI is used to schedule an uplink shared channel, and is used to indicate that the uplink shared channel is used to send only UCI.

The receiving module is configured to receive first UCI sent by the terminal device through the uplink shared channel.

According to a fifth aspect, an apparatus is provided. The apparatus includes a processor, configured to implement functions of the terminal device in the method described in the first aspect. The apparatus may further include a memory, configured to store a program instruction and data. The memory is coupled to the processor. The processor may invoke and execute the program instruction stored in the memory, so as to implement functions of the terminal device in the method described in the first aspect. The apparatus may further include a communications interface, and the communications interface is configured for communication between the apparatus and another apparatus. For example, the another apparatus may be a network device.

According to a sixth aspect, an apparatus is provided. The apparatus includes a processor, configured to implement functions of the network device in the method described in the second aspect. The apparatus may further include a memory, configured to store a program instruction and data. The memory is coupled to the processor. The processor may invoke and execute the program instruction stored in the memory, so as to implement functions of the network device in the method described in the second aspect. The apparatus may further include a communications interface, and the communications interface is configured for communication between the apparatus and another apparatus. For example, the another apparatus may be a terminal device.

According to a seventh aspect, a readable storage medium is provided. The readable storage medium includes an instruction, and when run on a computer, the instruction enables the computer to perform the steps included in the method according to any design example in the first aspect.

According to an eighth aspect, a readable storage medium is provided. The readable storage medium includes an instruction, and when run on a computer, the instruction enables the computer to perform the steps included in the method according to any design example in the second aspect.

According to a ninth aspect, an apparatus is provided. The apparatus includes at least one processor and a readable storage medium, and when an instruction included in the readable storage medium is executed by the at least one processor, the steps included in the method according to any design example in the first aspect may be performed. The apparatus may include a chip, or may include a chip and another discrete device.

According to a tenth aspect, an apparatus is provided. The apparatus includes at least one processor and a readable storage medium, and when an instruction included in the readable storage medium is executed by the at least one processor, the steps included in the method according to any design example in the second aspect may be performed. The apparatus may include a chip, or may include a chip and another discrete device.

According to an eleventh aspect, a chip system is provided. The chip system includes a processor, and may further include a memory, so as to implement the method according to the first aspect. The chip system may include a chip, or may include a chip and another discrete device.

According to a twelfth aspect, a chip system is provided. The chip system includes a processor, and may further include a memory, so as to implement the method according to the second aspect. The chip system may include a chip, or may include a chip and another discrete device.

According to a thirteenth aspect, a system is provided. The system includes the apparatus according to the third aspect and the apparatus according to the fourth aspect.

According to a fourteenth aspect, a system is provided. The system includes the apparatus according to the fifth aspect and the apparatus according to the sixth aspect.

According to a fifteenth aspect, a system is provided. The system includes the apparatus according to the ninth aspect and the apparatus according to the tenth aspect.

It should be understood that the foregoing general descriptions and the following detailed descriptions are merely illustrative and explanatory, and are not intended to limit this disclosure.

DESCRIPTION OF EMBODIMENTS

Figure 1:
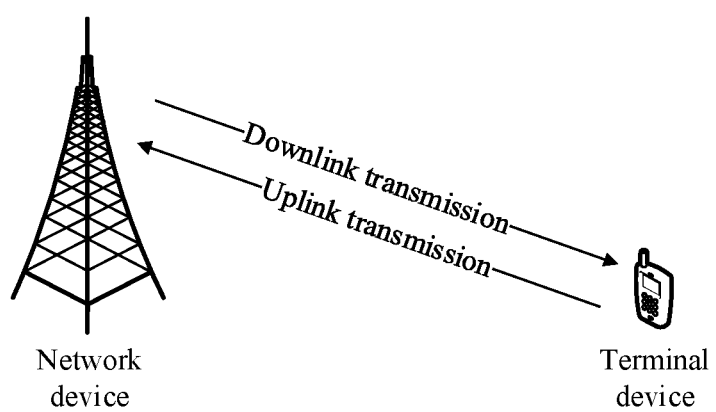
FIG. 1 is a schematic diagram of a possible application scenario in an embodiment of this application.

To make the objectives, technical solutions, and advantages of the embodiments of this application clearer, the following clearly describes the technical solutions in the embodiments of this application with reference to the accompanying drawings in the embodiments of this application.

In the embodiments of this application, "plurality" may represent at least two, for example, may be two, three, or more. This is not limited in the embodiments of this application.

In addition, the term "and/or" in this specification describes only an association relationship for associated objects and represents that three relationships may exist. For example, A and/or B may represent the following three cases: Only A exists, both A and B exist, and only B exists. In addition, the character "/" in this specification usually indicates an "or" relationship between the associated objects unless otherwise stated.

Unless otherwise stated, in the embodiments of this application, ordinal numbers such as "first," "second," and "third," are intended to distinguish between a plurality of objects, and not intended to limit a sequence, a time sequence, a priority, or an importance degree of the plurality of objects.

In the following, some terms in the embodiments of this application are described so as to help a person skilled in the art have a better understanding.

1. Terminal device: A terminal device used in the embodiments of this application may also be referred to as a terminal and may be a device having wireless receiving and sending functions. The terminal device may be deployed on land, including deployed indoors or outdoors, held in hand or mounted in vehicle; may be deployed on the surface of water (for example, in a steamship); or may be deployed in the air (such as on an airplane, a balloon, and a satellite). The terminal device may be user equipment (UE). The UE includes a handheld device, a vehicle-mounted device, a wearable device, or a computing device that has a wireless communication function. For example, the UE may be a mobile phone, a tablet computer, or a computer having wireless receiving and sending functions. Alternatively, the terminal device may be a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in a smart city, a wireless terminal in a smart home, or the like. In the embodiments of this application, an apparatus that implements a function of the terminal may be a terminal, or may be an apparatus that supports the terminal to implement the function, such as a chip, a circuit, or another apparatus. In the embodiments of this application, the technical solutions provided in the embodiments of this application are described by using an example in which the apparatus that implements the function of the terminal device is a terminal device.

2. Network device: A network device used in the embodiments of this application includes a base station (BS), and may be a device that is deployed in a radio access network and that can perform wireless communication with a terminal. The base station may be in a plurality of forms, for example, a macro base station, a micro base station, a relay station, and an access point. For example, the base station used in the embodiments of this application may be a gNB in a 5th generation mobile communication (5G) new radio (NR) system, a base station (for example, an eNB) in long term evolution (LTE) system, or a base station in an LTE advanced (LTE-A) system. The gNB in the NR system may also be referred to as a transmission reception point (TRP). In the embodiments of this application, an apparatus that implements a function of the network device may be a network device, or may be an apparatus that supports the network device to implement the function, such as a chip, a circuit, or another apparatus. In the embodiments of this application, the technical solutions provided in the embodiments of this application are described by using an example in which the apparatus that implements the function of the network device is a network device.

3. Uplink shared channel resource: An uplink shared channel resource, for example, a PUSCH resource, may be scheduled by a network device to a terminal device, and the terminal device may send data and/or control information by using the uplink shared channel resource.

The following briefly describes the technical background of the embodiments of this application.

In a current communications system, uplink control information (UCI) sent by a terminal device may be sent to a network device through a physical uplink control channel (PUCCH), or may be sent to a network device through a PUSCH. Generally, the PUCCH has higher reliability, but a capacity of information that can be carried on the PUCCH is less than that of the PUSCH. Therefore, some UCI with a relatively large payload is usually sent to the network device through the PUSCH. For example, channel state information (CSI), as a type of UCI with a relatively large payload size, is sent to the network device through the PUSCH in some cases.

The sending, by the terminal device, the UCI to the network device through the PUSCH includes two cases: (1) UL-SCH data and the UCI are sent together; and (2) UL-SCH data is not sent, but only the UCI is sent. In the embodiments of this application, the case in which only the UCI is sent, but the UL-SCH data is not sent is referred to as UCI-only or a UCI-only PUSCH. The "UCI-only PUSCH" means that the PUSCH is a channel used to send only the UCI. In practice, the terminal device currently cannot determine whether to send the UL-SCH data and the UCI together as in the case (1) or send only the UCI as in the case (2).

In view of the foregoing descriptions, the embodiments of this application provide an uplink control information sending method. In the method, the terminal device may receive first downlink control information (DCI) from the network device; determine, based on the received first DCI, that an uplink shared channel scheduled by using the first DCI is used to send only the UCI; and send first UCI to the network device through the uplink shared channel scheduled by using the first DCI. In other words, the network device may indicate to the terminal device by using the DCI, so that the terminal device can determine, based on the indication of the network device, whether to send only the UCI to the network device. To be specific, the terminal device may determine, based on a DCI indication of the network device, whether the uplink shared channel is UCI-only; and when the uplink shared channel is UCI-only, send the UCI to the network device through the uplink shared channel scheduled by using the DCI.

The technical solutions in the embodiments of this application may be applied to various communications systems, for example, may be applied to an NR system, an LTE system, or an LTE-A system.

In addition, the communications system to which the technical solutions in the embodiments of this application are applied may also be applicable to a future-proofed communications technology. The system described in the technical solutions in the embodiments of this application is intended to more clearly describe the technical solutions in the embodiments of this application, and does not constitute any limitation on the technical solutions provided in the embodiments of this application. A person of ordinary skill in the art may know that, with evolution of a network architecture, the technical solutions provided in the embodiments of this application are also applicable to a similar technical problem.

Next, an application scenario of the embodiments of this application is briefly described.

FIG. 1 is a schematic diagram of a possible application scenario according to an embodiment of this application. A network device and a terminal device are included. Functions of the network device and the terminal device have been described above and details are not described herein again. The application scenario shown in FIG. 1 may be an application scenario in an NR system, an application scenario in an LTE system, or the like. For example, the application scenario shown in FIG. 1 is the application scenario in the NR system. In this case, the network device may be a gNB in the NR system and the terminal device may be a terminal device in the NR system.

In the application scenario shown in FIG. 1, the network device may schedule a resource used by the terminal device, for example, allocate an uplink shared channel resource (for example, a PUSCH resource) for the terminal device. After allocating the uplink shared channel resource for the terminal device, the network device may notify the terminal device of the allocated uplink shared channel resource by using DCI. After receiving the DCI, the terminal device may learn of the uplink shared channel resource allocated by the network device, and then transmit information by using the allocated uplink shared channel resource, for example, send UL-SCH data and/or UCI to the network device by using the allocated uplink shared channel resource.

It should be noted that, the scenario shown in FIG. 1 should not constitute any limitation on the application scenario of this embodiment of this application. In actual application, a plurality of network devices and a plurality of terminal devices may be included. For example, one terminal device may transmit data to only one network device, or may transmit data to a plurality of network devices; alternatively, one network device may transmit data to one terminal device, or may transmit data to a plurality of terminal devices. This is not specifically limited in this embodiment of this application.

Figure 2:
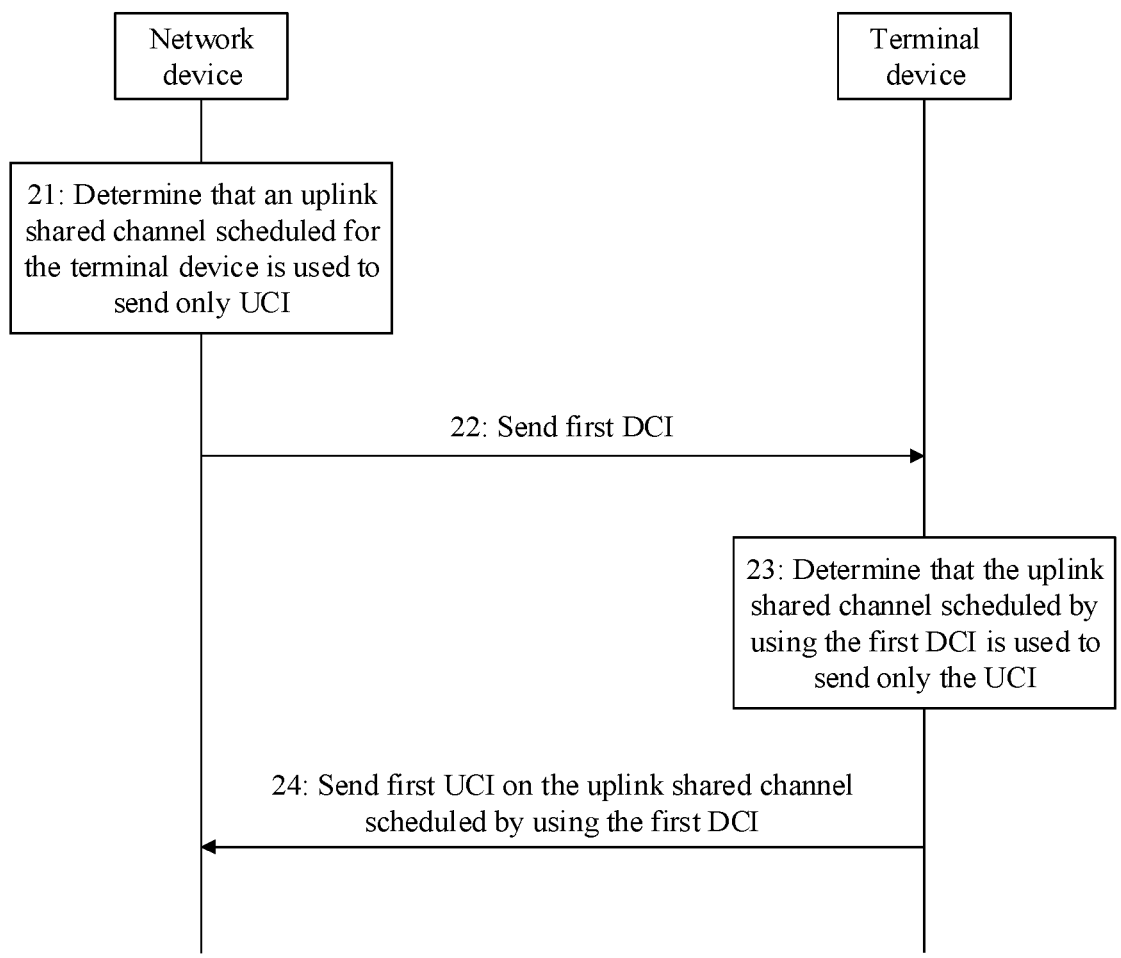
FIG. 2 is a flowchart of an uplink control information sending method according to an embodiment of this application.

FIG. 2 is a flowchart of an uplink control information sending method according to an embodiment of this application. In the following descriptions, that the method is applied to the scenario shown in FIG. 1 is used as an example. A procedure of the method is described as follows.

Step 21: A network device determines that an uplink shared channel scheduled for a terminal device is used to send only UCI.

First, for a terminal device, the network device may schedule a resource for the terminal device, for example, determine that the uplink shared channel scheduled for the terminal device is a channel used to send only the UCI, such as the foregoing UCI-only PUSCH.

Step 22: The network device sends first DCI to the terminal device and the terminal device receives the first DCI from the network device.

The network device may send DCI to the terminal device through a physical downlink control channel (PDCCH). For example, the DCI is referred to as the first DCI, and the first DCI may include resource allocation information and other control information. Because the DCI includes the resource allocation information, the uplink shared channel scheduled by the network device may be indicated by using the DCI. In other words, the DCI may be used to schedule the uplink shared channel.

In this embodiment of this application, if the network device needs to schedule the terminal device to perform transmission by using UCI-only, the terminal device may be scheduled by using the DCI. Specifically, the network device may first determine that the uplink shared channel scheduled for the terminal device is the channel used to send only the UCI; then, the network device generates the first DCI based on a determining result; and finally, the network device sends the first DCI to the terminal device, and the terminal device receives the first DCI.

In this embodiment of this application, the network device determines whether the uplink shared channel scheduled by using the DCI is UCI-only and the network device may notify the terminal device. Specifically, the network device notifies the terminal device by using the DCI. The DCI not only can be used to schedule the uplink shared channel, but also can be used to indicate whether the uplink shared channel scheduled by using the DCI is UCI-only. Therefore, to enable the terminal device to clearly know an UCI-only indication of the network device, the network device may send, to the terminal device, the DCI (for example, the first DCI) including the indication, thereby enhancing an interactive understanding between the network device and the terminal device.

In a specific implementation process, to indicate UCI-only by using the DCI, the network device may add indication information to the DCI when generating the DCI, where the indication information is used to indicate UCI-only. For ease of description, the indication information that is carried in the DCI and that is used to indicate UCI-only is referred to as UCI-only indication information. In other words, UCI-only may be determined by directly using the existing DCI and adding the UCI-only indication information to the DCI.

Step 23: The terminal device determines that the uplink shared channel scheduled by using the first DCI is used to send only the UCI.

Further, after receiving the first DCI sent by the network device, the terminal device may parse the first DCI to obtain the UCI-only indication information carried in the first DCI, and then determine, based on the UCI-only indication information, whether the uplink shared channel scheduled by using the first DCI is the channel used to send only the UCI. In other words, the terminal device may directly determine, based on the DCI sent by the network device, a type of information that is sent through the uplink shared channel scheduled by using the DCI. A possible result is that the terminal device determines, based on the DCI sent by the network device, that the uplink shared channel scheduled by using the DCI is the channel used to send only the UCI, thereby ensuring a consistent understanding between the network device and the terminal device, and enhancing capabilities of the network device for scheduling and controlling the terminal device.

It can be learned that, this embodiment of this application provides a manner in which the terminal device determines whether the uplink shared channel scheduled by the network device is used to send only the UCI, so as to enhance a function of the network device for indicating to the terminal device, and improve interaction performance of the network device and the terminal device. Moreover, the UCI-only determining manner provided in this embodiment of this application is a simple manner provided based on existing control information (that is, the DCI), and directly uses an existing signaling mode without increasing additional overheads, thereby helping save transmission resources.

Step 24: The terminal device sends first UCI to the network device through the uplink shared channel scheduled by using the first DCI, and the network device receives the first UCI on the uplink shared channel.

Further, after determining that the uplink shared channel scheduled by using the first DCI is the channel used to send only the UCI, the terminal device may send the UCI to the network device through the uplink shared channel scheduled by using the first DCI. For example, the UCI sent by the terminal device is referred to as the first UCI, and a corresponding type of information is transmitted by using the indication of the network device. This achieves a consistent understanding between the network device and the terminal device, and also enhances control of the terminal device by the network device.

In this embodiment of this application, the manner in which the network device indicates, to the terminal device by using the DCI, whether the scheduled uplink shared channel is UCI-only includes but is not limited to two methods. In other words, the terminal device may determine the indication of the network device according to the following two methods. For ease of understanding by a person skilled in the art, the following describes the two methods.

(1) A first determining method is to directly explicitly indicate UCI-only.

The network device may add a bit field to the existing DCI, to carry the indication information used to indicate that the uplink shared channel scheduled by using the DCI is UCI-only. For example, one extra bit may be added to carry the UCI-only indication information, the newly added bit field may be placed at a specific location based on a DCI format, in other words, the existing DCI format may be modified, and the newly added bit field is used to directly indicate UCI-only. After receiving the first DCI from the network device, the terminal device may obtain the UCI-only indication information from the bit field at the specific location in the first DCI, and then determine, based on the obtained UCI-only indication information, whether the uplink shared channel scheduled by using the first DCI is UCI-only. For example, when the foregoing one bit is 1, it indicates that the uplink shared channel is UCI-only; or when the foregoing one bit is 0, it indicates that the uplink shared channel is not UCI-only. Certainly, a correspondence between a value of the bit and indication content is not limited in this embodiment of this application.

In this embodiment of this application, the extra bit added in the DCI is used to explicitly indicate UCI-only, and the terminal device can directly, easily, and quickly obtain the corresponding UCI-only indication information based on the bit field at the specific location in the DCI, without performing additional calculation and other processes.

(2) A second determining method is to implicitly indicate UCI-only by using at least two parameters originally included in the DCI.

Currently, the DCI has a plurality of formats, such as a format 0, a format 0-0, a format 0-1, a format 1, a format 1A, and a format 1D. DCI corresponding to different DCI formats may include different information content. For example, DCI corresponding to a format includes information such as a hybrid automatic repeat request (HARQ) process number (ID), a new data indicator (NDI), a redundancy version (RV), and a modulation and coding scheme (MCS) index, where the MCS index may be represented by, for example, $I_{MCS}$.

It can be learned that, the DCI originally includes some parameters. For example, as described above, the DCI usually includes parameters such as the NDI, the RV, the HARQ process number, and $I_{MCS}$. Therefore, in the second determining method, the network device may directly use some parameters originally included in the DCI, to implicitly indicate UCI-only. Further, after receiving the DCI, the terminal device may determine, based on the indication of the network device, whether the uplink shared channel is UCI-only. When the at least two parameters included in the DCI are used to implicitly indicate UCI-only, information corresponding to the parameters used to implicitly indicate UCI-only may be understood as the foregoing UCI-only indication information. In this way, a modification to the DCI is relatively small.

In other words, in an existing information composition structure of the DCI, a value of a defined bit field (the defined bit field is used to carry information corresponding to a defined parameter) may be fully used to implement a new function of indicating UCI-only. Through reuse of the bit field that is in the DCI and that already carries related information, information use efficiency of the DCI can also be increased, or equivalently, signaling overheads are reduced to some extent, thereby saving resources.

In this embodiment of this application, the at least two parameters that are currently available in the DCI are used to indicate whether the uplink shared channel is UCI-only. Specifically, a value combination of two parameters in the DCI is an impossible combination in currently existing function combinations, that is, the value combination of the two parameters used to implicitly indicate UCI-only is not an existing function combination. For example, when the value combination of the two parameters represents two conflicting indications related to new data transmission and data retransmission in the prior art, it may be determined that the uplink shared channel scheduled by using the DCI is UCI-only. For example, a value of one parameter in the DCI indicates new data transmission, and a value of the other parameter in the DCI indicates data retransmission. The conflicting indications: one indicating data retransmission and the other indicating new data transmission, do not exist in a current normal case. Therefore, in this embodiment of this application, a conflicting indication combination that does not exist in the normal case is used to indicate UCI-only. However, for the terminal device, if determining that the DCI carries the two conflicting indications, the terminal device considers that the network device neither indicates data retransmission nor indicates new data transmission actually, but indicates UCI-only. That is, a function combination that does not exist currently is used to implicitly indicate UCI-only.

In addition, it should be noted that, in this embodiment of this application, for example, when the currently impossible combination that includes the two conflicting indications, new data transmission and data retransmission, are used to indicate UCI-only, the new data transmission and data retransmission herein are not used to actually indicate new data transmission and data retransmission, in other words, the terminal device does not transmit new data or retransmit data based on the indications. In this embodiment of this application, the currently impossible indication combination is merely used to implicitly indicate UCI-only, that is, a different combination of parameters is used to implement a new indication function.

In the second determining method, the DCI may include a plurality of parameters. For ease of understanding by a person skilled in the art, the following lists several parameters for description.

In a manner 1, an NDI and an RV are used to determine whether the uplink shared channel is UCI-only.

The NDI and the RV are parameters indicated by using two bit fields in the DCI. The NDI fixedly occupies one bit. Whether the network device indicates new data transmission or data retransmission may be determined based on whether NDI flipping occurs. For example, compared with previous DCI, if NDI flipping occurs, it indicates new data transmission; or if no NDI flipping occurs, it indicates data retransmission. The RV usually occupies two bits, and different values of the RV represent different meanings. For example, when a value of the RV is 1 or 2, it indicates data retransmission.

In the prior art, NDI flipping may be used to indicate new data transmission, and the value 1 or 2 of the RV may be used to indicate data retransmission. Therefore, in the manner 1, the network device uses a currently impossible combination that includes the two conflicting indications, new data transmission and data retransmission, to indicate UCI-only, and the terminal device may determine UCI-only based on the indication combination.

To be specific, conditions that are provided in the manner 1 and that are used to determine UCI-only are as follows:
(1) NDI flipping occurs; and
(2) RV=1 or RV=2.

Based on the foregoing descriptions, to determine, based on the NDI, whether new data is transmitted, whether NDI flipping occurs needs to be determined first. To determine whether NDI flipping occurs, values of NDIs in two pieces of DCI are needed. One piece of DCI is the currently received DCI, that is, the first DCI; and the other piece of DCI is previous DCI that carries the same HARQ process number as the first DCI and that is closest to the first DCI in time. For ease of description, the other piece of DCI is referred to as second DCI in this embodiment of this application. Because the second DCI is a previous DCI received before the first DCI, the second DCI may be received by the terminal device before the first DCI is received.

For example, the network device sets a value of an NDI in the second DCI to 1. If expecting to indicate UCI-only by using the first DCI, the network device may set a value of an NDI in the first DCI to 0, and set a value of an RV in the first DCI to 1 or 2. Further, after receiving the first DCI, the terminal device may compare the NDI carried in the first DCI with the NDI carried in the second DCI, to determine whether NDI flipping occurs. If determining that NDI flipping occurs, the terminal device may determine whether the value of the RV in the first DCI is 1 or 2. Alternatively, the terminal device may simultaneously perform two processes of determining whether NDI flipping occurs and determining whether the value of the RV in the first DCI is 1 or 2. Alternatively, the terminal device may first determine whether the value of the RV in the first DCI is 1 or 2, and then determine whether NDI flipping occurs. In conclusion, when the two conditions are met, the terminal device may determine that the uplink shared channel scheduled by using the first DCI is used to send only the UCI.

In a manner 2, an NDI and $I_{MCS}$ are used to determine whether the uplink shared channel is UCI-only.

$I_{MCS}$ is an MCS index in an MCS table. The MCS table includes a plurality of MCS indexes, and each MCS index corresponds to a respective code rate, a modulation order, spectrum efficiency, and the like, where the modulation order is represented by, for example, $Q_m$. There are already a plurality of MCS tables currently. For example, Table 1, Table 2, and Table 3 are three common MCS tables currently. A highest modulation order supported in MCS tables shown in Table 1 and Table 3 is 6, and a highest modulation order supported in an MCS table shown in Table 2 is 8.

Moreover, terminal devices may correspond to respective MCS tables depending on different highest modulation orders that the terminal devices can support and whether discrete Fourier transform (DFT) precoding is applied to the uplink shared channel. In other words, the terminal devices may match the respective MCS tables based on different capabilities of the terminal devices.

TABLE 1

| MCS index | Modulation order | Target code rate × 1024 | Spectrum efficiency |
| --- | --- | --- | --- |
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |

TABLE 1-continued

| MCS index | Modulation order | Target code rate × 1024 | Spectrum efficiency |
|---|---|---|---|
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | | Reserved |
| 30 | 4 | | Reserved |
| 31 | 6 | | Reserved |

TABLE 2

| MCS index | Modulation order | Target code rate × 1024 | Spectrum efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | | Reserved |
| 29 | 4 | | Reserved |
| 30 | 6 | | Reserved |
| 31 | 8 | | Reserved |

TABLE 3

| MCS index | Modulation order | Target code rate × 1024 | Spectrum efficiency |
|---|---|---|---|
| 0 | q | 240/q | 0.2344 |
| 1 | q | 314/q | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | 1 | | Reserved |
| 29 | 2 | | Reserved |
| 30 | 4 | | Reserved |
| 31 | 6 | | Reserved |

Similar to the manner 1, whether the NDI in the first DCI indicates new data transmission is determined by determining whether flipping occurs on the NDI in the first DCI compared with the NDI in the second DCI. When it is determined that NDI flipping occurs, it indicates that the first DCI indicates new data transmission.

Further, when a value of $I_{MCS}$ is a predetermined value, it may indicate that the network device expects to use $I_{MCS}$ to indicate data retransmission, so that the data retransmission indication and the new data transmission indication that is represented through NDI flipping form a function combination that does not exist currently and that includes the conflicting indications. Specifically, two conditions may be set: "the value of $I_{MCS}$ is any one of index values indicating a highest modulation order in an MCS table" and "the value of $I_{MCS}$ is an index value in an MCS table that is greater than a predetermined value". When at least one of the two conditions is met, it may be considered that the value of $I_{MCS}$ is used to indicate data retransmission, so that the data retransmission indication and the new data transmission indication represented through NDI flipping form the two conflicting indications. In this case, UCI-only can be determined.

For ease of understanding by a person skilled in the art, the following lists several cases for description.

(a) $I_{MCS} \in$ {index values indicating a highest modulation order in an MCS table}. To be specific, the value of $I_{MCS}$ belongs to a set including the index values indicating the highest modulation order in the MCS table. It should be noted that, when different MCS tables are used, index values indicating a highest modulation order in the MCS tables may be different.

For example, in the MCS table shown in Table 1, the highest modulation order in the MCS table is 6, and a set of all index values corresponding to the modulation order 6 is {17, 18, 19, 20, 21, 22, 23, 24, 25, 26, 27, 28, 31}.

For example, in the MCS table shown in Table 2, the highest modulation order in the MCS table is 8, and a set of index values corresponding to the modulation order 8 is {20, 21, 22, 23, 24, 25, 26, 27, 31}.

For example, in the MCS table shown in Table 3, the highest modulation order in the MCS table is 6, and a set of all index values corresponding to the modulation order 6 is {17, 18, 19, 20, 21, 22, 23, 24, 25, 26, 27, 31}.

For any MCS table, provided that the value of $I_{MCS}$ belongs to a set of index values corresponding to a highest modulation order in the MCS table, it may be considered that $I_{MCS}$ meets a condition of indicating data retransmission. Using the MCS table in Table 3 as an example, when the value of $I_{MCS}$ in the first DCI is 27, a modulation order corresponding to $I_{MCS}$ is 6, a highest modulation order. In this case, it may be considered that $I_{MCS}$ with the value of 27 is used to indicate data retransmission, and further, UCI-only may be determined. For another example, when the value of $I_{MCS}$ in the first DCI is 6, a modulation order corresponding to $I_{MCS}$ is 2, not the highest modulation order 6. Therefore, it may be considered that $I_{MCS}$ with the value of 6 does not indicate data retransmission, and in this case, it may be determined that the uplink shared channel is not UCI-only.

In a normal case, new data transmission is performed through lower-order modulation, and highest-order modulation is usually not used during retransmission or a plurality of retransmissions. Therefore, the network device fully uses a non-regular case based on the principle, that is, uses an index value corresponding to a highest modulation order to indicate data retransmission, so as to form an indication conflicting with new data transmission represented through NDI flipping. In this way, the two conflicting indications are used to indicate UCI-only to the terminal device.

(b) $I_{MCS} \in \{28, 29, 30, 31\}$ or $I_{MCS} \in \{29, 30, 31\}$.

Each of the current MCS tables includes 31 index values, and index values 28, 29, 30, and 31 are several larger values in the MCS tables. Moreover, code rates corresponding to 28, 29, 30, and 31 in Table 2 and Table 3 and code rates corresponding to 29, 30, and 31 in Table 1 are "reserved", and "reserved" indicates that the code rates are reserved. In other words, corresponding code rates are not set for the index values 28, 29, 30, and 31, or the index values 29, 30, and 31 in the current MCS tables. Because the code rates are not set, currently, in a normal case, the network device usually does not use the index values to indicate new data transmission. Based on this, the network device uses the index values for which the corresponding code rates are not set currently, to indicate data retransmission, so that the data retransmission indication and the new data transmission indication represented through NDI flipping form two conflicting indications. In this manner, UCI-only is determined.

(c) $I_{MCS} \in \{$index values indicating a highest modulation order in an MCS table$\} \cup \{28, 29, 30, 31\}$.

The case c is a combination of the two cases: a and b. Descriptions are not repeated herein. However, it should be noted that, index values indicating a highest modulation order in an MCS table may overlap with 28, 29, 30, and 31. Using the MCS table shown in Table 2 as an example, a set of all index values indicating the highest modulation order in the MCS table shown in Table 2 is {20, 21, 22, 23, 24, 25, 26, 27, 31}, and 31 in the set is an element that overlaps with that in a set {28, 29, 30, 31} including large index values. Because there is "∪" relationship between the two sets, 31 is used only once finally, that is, a final set after "∪" is {20, 21, 22, 23, 24, 25, 26, 27, 28, 29, 30, 31}.

According to the foregoing descriptions, in the manner 2, conditions that are used to determine UCI-only are as follows:

(1) NDI flipping occurs; and
(2) $I_{MCS} \in \{$index values indicating a highest modulation order in an MCS table$\}$; or $I_{MCS} \in \{28, 29, 30, 31\}$ or $I_{MCS} \in \{29, 30, 31\}$; or $I_{MCS} \in \{$index values indicating a highest modulation order in an MCS table$\} \cup \{28, 29, 30, 31\}$.

Figure 3:
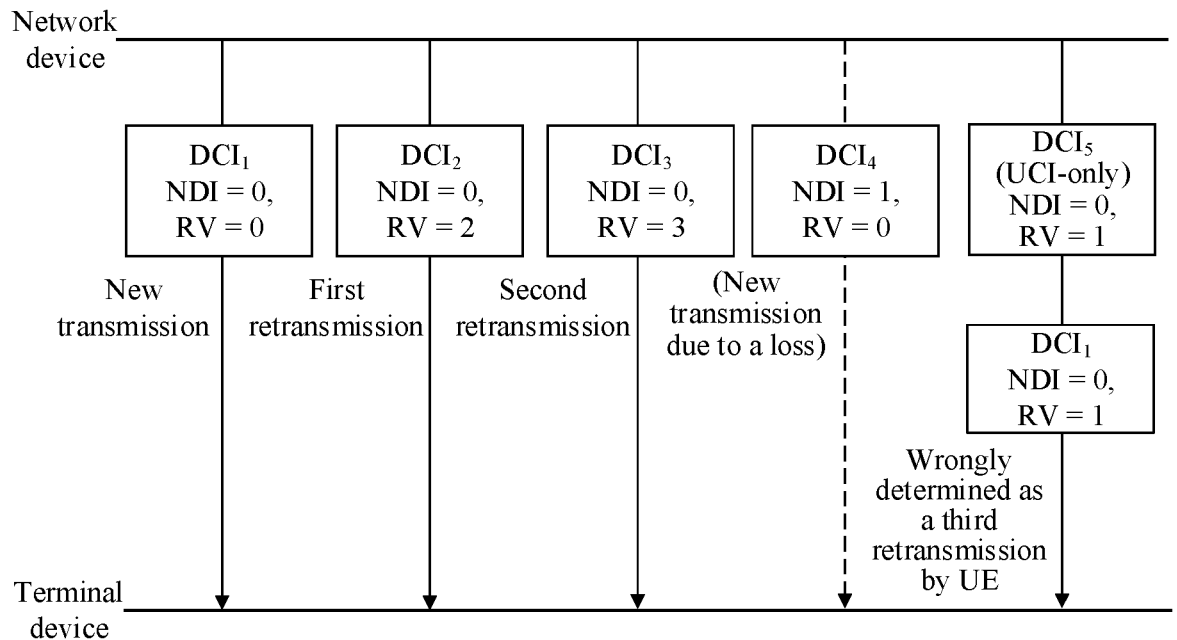
FIG. 3 is a schematic diagram of sending and receiving DCI between a network device and a terminal device by using a same HARQ process number in an embodiment of this application.

In addition, in the UCI-only determining manners described above, there may be a PDCCH miss-detection, and the PDCCH miss-detection may result in wrong determining of UCI-only. For example, FIG. 3 is a schematic diagram of sending and receiving, from left to right in chronological order, DCI between the network device and the terminal device by using a same HARQ process number.

First, the network device uses a $DCI_1$ to indicate a PUSCH used to transmit new data, and RV=0. After the terminal device sends data of the PUSCH based on an indication of the $DCI_1$, the network device fails to decode the received data, where failing to decode the received data means that a cyclic redundancy check (CRC) check fails. In this case, the network device uses a $DCI_2$ to indicate that retransmission is required, and RV=2. Afterwards, the network device fails to decode the received data again, and uses a $DCI_3$ to indicate that retransmission is required, and RV=3. In this case, decoding succeeds.

Then, the network device uses a $DCI_4$ to indicate next data that needs to be newly transmitted (NDI flipping), but the $DCI_4$ is lost.

Finally, the network device uses a $DCI_5$ to indicate a UCI-only PUSCH, that is, sets a value different from a value of an NDI in the $DCI_4$ for an NDI in the $DCI_5$, and sets RV=1. Because the value of the NDI in the $DCI_4$ is 1, the value of the NDI in the $DCI_5$ is set to 0. In other words, the network device expects to indicate UCI-only through NDI flipping and RV=1. However, the $DCI_4$ is lost, and the terminal device does not receive the $DCI_4$. Therefore, when the $DCI_5$ is received, the $DCI_5$ is compared with the previously received $DCI_3$, and it is found that the NDIs are both 0, that is, no NDI flipping occurs. In this case, the $DCI_5$ is wrongly considered to be used to indicate retransmission of previous PUSCH data.

It can be learned that, the terminal device may wrongly determine UCI-only due to a loss of the DCI in a transmission process. Specifically, NDI flipping actually occurs, but it is wrongly considered that no NDI flipping occurs. In view of this, in this embodiment of this application, another determining condition of determining UCI-only is further added. Adding a determining condition can reduce impact of wrong determining on a final determining result, thereby improving determining accuracy and avoiding a case in which UCI-only cannot be indicated due to wrong determining. For ease of understanding by a person skilled in the art, the following uses a manner 3 and a manner 4 as examples to describe a determining manner in which a new determining condition is added.

In the manner 3, an NDI, an RV, and $I_{MCS}$ are used to determine whether the uplink shared channel is UCI-only.

For example, in the foregoing manner 1, because NDI flipping may be wrongly determined as shown in FIG. 3, the indication of the NDI may be ignored in this embodiment of this application. Then, $I_{MCS}$ is used as a newly added determining condition to determine whether the uplink shared channel is UCI-only. To be specific, the indication of the NDI is ignored, and on the premise that the value of the RV is 1 or 2, $I_{MCS}$ described in the manner 2 and the RV form a value combination that is impossible in the prior art, so as to ensure UCI-only determining accuracy when the NDI does not work due to wrong determining.

In a possible implementation, in the manner 3, conditions used to determine UCI-only are as follows:
(1) NDI flipping occurs;
(2) RV=1 or RV=2; and
(3) $I_{MCS} \in$ {index values indicating a highest modulation order in an MCS table}; or $I_{MCS} \in$ {28, 29, 30, 31} or $I_{MCS} \in$ {29, 30, 31}; or $I_{MCS} \in$ {index values indicating a highest modulation order in an MCS table}$\cup$ {28, 29, 30, 31}.

In another possible implementation, in the manner 3, conditions used to determine UCI-only are as follows:
(1) no NDI flipping occurs;
(2) RV=1 or RV=2; and
(3) $I_{MCS} \in$ {index values indicating a highest modulation order in an MCS table}; or $I_{MCS} \in$ {28, 29, 30, 31} or $I_{MCS} \in$ {29, 30, 31}; or $I_{MCS} \in$ {index values indicating a highest modulation order in an MCS table}$\cup$ {28, 29, 30, 31}.

In the manner 4, an NDI, an RV, and a HARQ process number are used to determine whether the uplink shared channel is UCI-only.

Similar to the manner 3, when wrong determining shown in FIG. 3 occurs, the indication of the NDI may be ignored, and the HARQ process number is used as a newly added determining condition to determine whether the uplink shared channel is UCI-only. Specifically, when the indication of the NDI is ignored, and the value of the RV is 1 or 2, data retransmission is indicated in a normal case. Because a HARQ process number having a relatively large value such as 15 or 14 is usually not used in the normal case, a currently impossible parameter combination in which the RV indicates data retransmission and the HARQ process number is 15 or 14 is used to indicate UCI-only. This can ensure UCI-only determining accuracy when the NDI cannot work due to wrong determining. Moreover, because the HARQ process number of 14 or 15 is rarely used in the normal case, wrong determining described in FIG. 3 may not affect normal running of a HARQ.

In other words, in the manner 4, conditions used to determine UCI-only are as follows:
(1) NDI flipping occurs;
(2) RV=1 or RV=2; and
(3) HARQ process number=14 or HARQ process number=15.

The foregoing descriptions are merely examples. The manner used for determining UCI-only based on the existing parameters included in the DCI in this embodiment of this application includes but is not limited to those described above. In a specific implementation process, another manner may be obtained through summarization, variation, or extension based on the several manners described above. Any determining manner based on the existing parameters in the DCI and a function combination that is not included in the current function combinations shall fall within the protection scope of this application.

As described above, after determining the UCI-only PUSCH, the terminal device may send the UCI to the network device on the PUSCH. The UCI may include several parts of information, for example, include three parts: CSI-part1, CSI-part2, and a HARQ-acknowledgement (ACK). Each part in the UCI can be sent to the network device only when a quantity of REs and a corresponding code rate are known in advance. For the foregoing parts in the UCI, a payload size of the CSI-part2 is affected by specific values of some parameters in the CSI-part1. For example, when a rank in a rank indication (RI) in the CSI-part1 is equal to 1, the payload size of the CSI-part2 is relatively small; or if an RI in the CSI-part1 indicates that rank=2, the payload size of the CSI-part2 is relatively large. Because the network device cannot learn of specific sizes of parts in the CSI-part1, that is, cannot learn of payload sizes of the parts, the network device cannot obtain a total payload size of the CSI in advance, and cannot schedule, based on the total payload size, a PUSCH resource adapted to the total payload size, to send the CSI. Because the parts have different payload sizes and different importance degrees, respective code rates and modulation orders are needed to send the parts in the UCI.

The network device may indicate the allocated PUSCH resource to user equipment in the DCI sent to the user equipment. After receiving and parsing the DCI, the UE can know the PUSCH resource allocated by the network device, that is, can know a total quantity of REs that are used for UCI transmission. Further, because the UCI includes a plurality of parts, such as the HARQ ACK, the CSI-part1, and the CSI-part2, the user equipment needs to allocate, to the parts in the UCI according to a specific rule, the PUSCH resource allocated by the network device. Therefore, determining quantities of REs that are allocated to the parts in the UCI is also a mandatory step before the UCI is sent.

In other words, sending the UCI may be understood as sending the parts of information that are included in the UCI. In a possible implementation, the three parts: the CSI-part1, the CSI-part2, and the HARQ ACK included in the UCI are sent. Moreover, to send any part in the UCI, a quantity of REs that are used to send each part and a corresponding code rate need to be determined in advance. With respect to the quantity of REs that are used to send each part, because the DCI sent by the network device already includes the total quantity of REs that are used to send the UCI, if quantities of REs that are used to send two of the three parts are known, a quantity of REs that are used to send a third part may be known naturally.

Currently, a quantity $Q'_{ACK}$ of REs that are allocated to the HARQ ACK may be calculated according to a formula (1), a quantity $Q'_{CSI-1}$ of REs that are allocated to the CSI-part1 may be calculated according to a formula (2), and a code rate used to send the CSI-part1 may be calculated according to a formula (3):

$$Q'_{ACK} = \min\left\{\left\lceil\frac{(O_{ACK} + L_{ACK}) \cdot \beta^{ACK}_{offset} \cdot \sum_{l=0}^{N^{PUSCH}_{symb,all}-1} M^{UCI}_{sc}(l)}{(O_{CSI-1} + L_{CSI-1})\beta^{CSI-part1}_{offset}}\right\rceil, \sum_{l=0}^{N^{PUSCH}_{symb,all}-1} M^{UCI}_{sc}(l)\right\}, \quad \text{formula (1)}$$

-continued $$Q'_{CSI-1} = \min\left\{\left\lceil\frac{(O_{CSI-1} + L_{CSI-1}) \cdot \beta_{offset}^{CSI-part1} \cdot \sum_{l=0}^{N_{symb,all}^{PUSCH}-1} M_{sc}^{UCI}(l)}{(O_{CSI-2-ref} + L_{CSI-2-ref})\beta_{offset}^{CSI-part2}}\right\rceil, \sum_{l=0}^{N_{symb,all}^{PUSCH}-1} M_{sc}^{UCI}(l) - Q'_{ACK}\right\},$$

formula (2)

and $$\gamma_{CSI-1} = \frac{O_{CSI-1} + L_{CSI-1}}{Q'_{CSI-1} \cdot Q_m},$$

formula (3)

where $\sum_{l=0}^{N_{symb,all}^{PUSCH}-1} M_{sc}^{UCI}(l)$ represents a quantity of all REs for the PUSCH, that is, the total quantity of REs that are allocated by the network device to the PUSCH; $O_{CSI-2-ref}$ represents a reference payload size of the CSI-part2, and $L_{CSI-2-ref}$ represents a corresponding quantity of CRC bits; and $O_{CSI-1}$ represents the payload size of the CSI-part1, and $L_{CSI-1}$ represents a corresponding quantity of CRC bits. $O_{CSI-1}+L_{CSI-1}$ may be understood as a total payload size of the CSI-part1, and $O_{CSI-2-ref}+L_{CSI-2-ref}$ may be understood as a total reference payload size of the CSI-part2. $\beta_{offset}^{CSI-part1}$ and $\beta_{offset}^{CSI-part2}$ represent code rate compensation parameters of the CSI-part1 and the CSI-part2, respectively, and are semi-statically preconfigured by a wireless higher layer of the network device or dynamically indicated by using the DCI subsequently.

In addition, a min {,} function in the formula (2) means that a value of a parameter on the left of "=" is the smaller one of two values included in the min function. Similarly, min functions in the following formulas have the same meaning.

In a process of calculating $Q'_{CSI-1}$ according to the formula (2), the reference payload size $O_{CSI-2-ref}$ of the CSI-part2 is set to a fixed value, lacking flexibility. For example, a typical value of $O_{CSI-2-ref}$ is a payload size of the CSI-part2 when rank=1 or rank=2. If a payload size (relatively small) of the CSI-part2 when rank=1 is selected as $O_{CSI-2-ref}$, it may be learned from the formula (2) that $Q'_{CSI-1}$ is relatively large, and some or all of the CSI-part2 must be dropped. If a payload size (relatively large) of the CSI-part2 when rank=2 is selected as $O_{CSI-2-ref}$, it may be learned from the formula (2) that a quantity of REs that are allocated to the CSI-part1 is relatively small. This results in insufficient protection for the CSI-part1. Especially, if rank=1 in practice, the payload size of the CSI-part2 is not large, whereas the quantity $Q'_{CSI-2}$ of allocated REs (that is, the quantity of REs that are allocated to the CSI-part2) is excessively large. In this case, protection is excessively large, resulting in a waste.

In addition, the calculation formula of $Q'_{ACK}$ also has the following problem. In the formula (1), if the payload size $O_{ACK}+L_{ACK}$ of the HARQ-ACK is relatively large, for example, when $(O_{ACK}+L_{ACK}) \cdot \beta_{offset}^{ACK} > (O_{CSI-1}+L_{CSI-1}) \cdot \beta_{offset}^{CSI-part1}$, for the min {,} function in the formula (1) only the second item on the right of the comma is selected, and the first item on the left of the comma cannot work, that is, the calculated $Q'_{ACK}$ is the total quantity of REs that are allocated to the PUSCH. In other words, all REs allocated to the UCI are allocated to the HARQ-ACK. Obviously, in this case, there is no RE for sending the CSI-part1 and the CSI-part2. This conflicts with an actual case.

Based on the foregoing analysis, a fixed payload size is currently used to calculate a quantity of REs. The solution is less flexible, and in some cases, there may be no available REs for sending the CSI-part1 and the CSI-part2. Therefore, the current RE calculation manner is not feasible for sending the CSI.

In view of the foregoing descriptions, a method of obtaining a reference code rate by directly performing a lookup in an MCS table, and then calculating a quantity of REs based on the corresponding obtained code rate is proposed, to resolve the problem of relatively poor flexibility and infeasibility for sending the CSI caused when the fixed payload size is used to calculate the quantity of REs. Specifically, a value of a 4-bit HARQ process number field in the DCI may be used to indicate an MCS index value, and then a corresponding code rate is obtained as a target code rate $\gamma_{CSI-1}$ of the CSI-part1 through MCS table lookup based on the determined MCS index value. To be specific, the network device indicates $\gamma_{CSI-1}$ to the UE by using the HARQ process number field in the DCI, and then calculates, according to a formula (4), the quantity of REs that are allocated to the CSI-part1:

$$Q'_{CSI-1} = \min\left\{\left\lceil\frac{(O_{CSI-1} + L_{CSI-1})}{\gamma_{CSI-1} \cdot Q_m}\right\rceil, \sum_{l=0}^{N_{symb,all}^{PUSCH}-1} M_{sc}^{UCI}(l) - Q'_{ACK}\right\}.$$

formula (4)

The MCS index in all existing MCS tables includes five bits, and there is an MCS table mismatch when a lookup is performed on an MCS table by using four bits. Therefore, a new MCS table needs to be defined. In other words, the new MCS table needs to be introduced in the foregoing manner, indicating a significant modification to an existing standard. In addition, extra study is required to optimize the new MCS table, making it difficult to complete formulation of a standard on time. Moreover, for product implementation of the network device and the terminal device, the new MCS table needs extra storage space overheads.

In view of the foregoing descriptions, in this embodiment of this application, after UCI-only is determined, the code rate and the corresponding modulation order may be directly obtained through MCS table lookup. For ease of description, the code rate obtained through MCS table lookup is referred to as a reference code rate or a first code rate in this specification, and is represented by $\gamma_{ref}$; and the modulation order obtained through MCS table lookup is represented by $Q_m$.

This embodiment of this application provides the following two specific table lookup manners.

Table lookup manner 1: In a possible implementation, a lookup may be performed in a currently existing MCS table by directly using $I_{MCS}$ in the DCI. For example, a lookup is performed in any MCS table in Table 1, Table 2, or Table 3 described above. The corresponding code rate and modulation order may be obtained through MCS table lookup based on $I_{MCS}$. For example, when a value of $I_{MCS}$ is 22, a code rate 666 and a modulation order 6 may be obtained by performing a lookup in the MCS table shown in Table 1. In addition, it should be noted that, the code rate in Table 1 is obtained by multiplying a target code rate by 1024, and therefore, a corresponding code rate found in the MCS table needs to be divided by 1024.

Table lookup manner 2: In another possible implementation, the foregoing reference code rate may be determined based on all bits indicating the HARQ process number and some of all bits indicating $I_{MCS}$ in this embodiment of this application. Because the existing manner of performing a lookup in the MCS table by directly using the 4-bit HARQ process number results in a significant modification to the existing standard and the HARQ process number includes four bits and $I_{MCS}$ includes five bits, all the bits in the HARQ process number and some bits in $I_{MCS}$ may be used to create a 5-bit MCS index value that completely conforms to the existing MCS tables. In this way, the existing MCS tables can be directly used, without having to introduce a new table, so as to minimize a modification to the existing standard. For ease of description, in this embodiment of this application, the index value corresponding to the created five bits is represented by $I'_{MCS}$.

Figure 4:
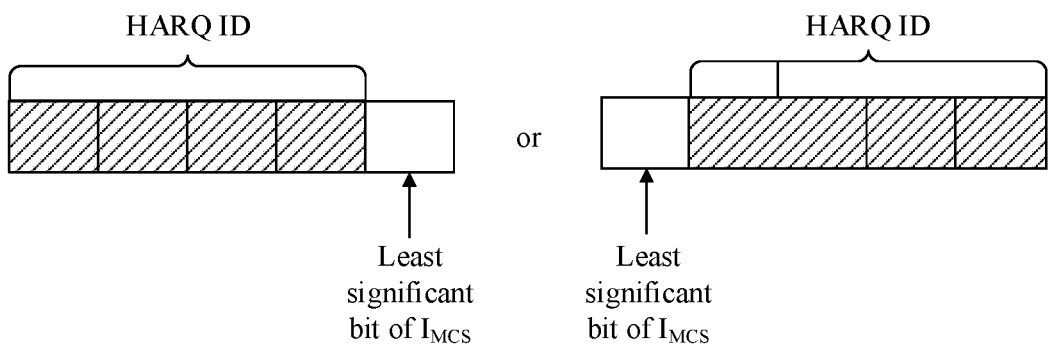
FIG. 4 is a schematic diagram of creating a new MCS index based on a HARQ process number and an MCS index in an embodiment of this application.

Specifically, all the bits (that is, four bits) in the HARQ process number and one bit in $I_{MCS}$ may be used to construct a bit field including five bits, and then, a value of the constructed bit field is used to represent an index value for table lookup, that is, $I'_{MCS}$. For example, FIG. 4 is a schematic diagram of constructing, based on the HARQ process number and $I_{MCS}$, a bit field including 5 bits. FIG. 4 shows two methods for constructing the bit field. For either of the two methods, bits marked by slashes are the four bits in the HARQ process number, the remaining one bit is the one bit in $I_{MCS}$. For example, as shown in FIG. 4, the one bit in $I_{MCS}$ is a least significant bit in $I_{MCS}$, because directly using the least significant bit in $I_{MCS}$ is relatively convenient and a value of the least significant bit in $I_{MCS}$ has relatively small impact on the value of $I_{MCS}$. Optionally, as shown in the construction manner on the left of FIG. 4, the least significant bit in $I_{MCS}$ may be directly placed after the four bits in the HARQ process number, that is, the least significant bit in $I_{MCS}$ is used as a least significant bit in the newly constructed bit field. Alternatively, as shown in the construction manner on the right of FIG. 4, the least significant bit in $I_{MCS}$ may be directly placed before the four bits in the HARQ process number, that is, the least significant bit in $I_{MCS}$ is used as a most significant bit in the newly constructed bit field. By using the manner shown in FIG. 4, the five bits can be constructed directly by setting one bit as the least significant bit or the most significant bit on a basis of the four bits in the HARQ process number, and there is a relatively small modification to the existing four bits in the HARQ process number. Alternatively, optionally, the one bit in $I_{MCS}$ may be placed at any location among the four bits in the HARQ process number, for example, placed between a least significant bit and a last but one least significant bit of the four bits in the HARQ process number. This is not limited in this embodiment of this application, and setting may be performed based on an actual requirement in a specific implementation process.

In addition, in the manner described above in which a 5-bit new index is constructed by using the four bits in the HARQ process number and the one bit in $I_{MCS}$, values of the four bits in the HARQ process number and the one bit in $I_{MCS}$ are merely reused, and there is no impact on structures and values of the HARQ process number and $I_{MCS}$. For example, values of the original four bits in the HARQ process number are 1001, and values of the five bits in $I_{MCS}$ are 11111. It can be seen that the least significant bit in $I_{MCS}$ is 1. In this case, according to the manner shown on the left of FIG. 4, the newly constructed five bits are 10011, and a corresponding value of $I'_{MCS}$ is 19. Because the values of the original four bits in the HARQ process number and the least significant bit in $I_{MCS}$ are merely reused, there is no impact on the structures and the values of the HARQ process number and $I_{MCS}$, that is, the HARQ process number may still represent a process 1001 (that is, a code is 9), and $I_{MCS}$ may still represent an index value 31.

Regardless of a table lookup manner used for table lookup, both the reference code rate $\gamma_{ref}$ and the modulation order $Q_m$ may be obtained through table lookup, and further, quantities of REs that are used to send the parts in the UCI may be calculated according to the following formulas:

$$Q'_{ACK} = \min\left\{\left\lceil\frac{(O_{ACK} + L_{ACK}) \cdot \beta^{ACK}_{offset}}{\gamma_{ref} \cdot Q_m}\right\rceil, \sum_{l=0}^{N^{PUSCH}_{symb,all}-1} M^{UCI}_{sc}(l)\right\}, \quad \text{formula (5)}$$

$$Q'_{CSI-1} = \min\left\{\left\lceil\frac{(O_{CSI-1} + L_{CSI-1}) \cdot \beta^{CSI-part1}_{offset}}{\gamma_{ref} \cdot Q_m}\right\rceil, \quad \text{formula (6)}\right.$$

$$\left.\sum_{l=0}^{N^{PUSCH}_{symb,all}-1} M^{UCI}_{sc}(l) - Q'_{ACK}\right\}, \text{ and}$$

$$Q'_{CSI-2} = \sum_{l=0}^{N^{PUSCH}_{symb,all}-1} M^{UCI}_{sc}(l) - Q'_{CSI-1} - Q'_{ACK}. \quad \text{formula (7)}$$

In addition, a code rate used to send each part may be further obtained according to the following formula:

$$\gamma_{CSI-1} = \frac{\gamma_{ref}}{\beta^{CSI-part1}_{offset}}. \quad \text{formula (8)}$$

In practice, a threshold code rate $C_T$ is set for the CSI-part2. A function of the threshold code rate $C_T$ is to restrict a code rate of the CSI-part2 to be not higher than the threshold code rate. If the code rate of the CSI-part2 is higher than the threshold code rate, some information in the CSI-part2 may be dropped based on a priority, until an actual code rate of the CSI-part2 is not higher than the threshold code rate. Moreover, the threshold code rate $C_T$ may be usually calculated according to a formula (9). In other words, the threshold code rate $C_T$ may be calculated after a code rate $\gamma_{CSI-1}$ of the CSI-part1 is obtained according to the formula (8):

$$C_T = \frac{\beta^{CSI-part1}_{offset}}{\beta^{CSI-part2}_{offset}} \cdot \gamma_{CSI-1}. \quad \text{formula (9)}$$

Because $\gamma_{CSI-1}$ in the formula (9) may be calculated according to the formula (8), a formula (10) may be further obtained with reference to the formula (8) and the formula (9):

$$C_T = \frac{\gamma_{ref}}{\beta_{offset}^{CSI-part2}}. \qquad \text{formula (10)}$$

In this embodiment of this application, the code rate $\gamma_{CSI-1}$ of the CSI-part1 is obtained after specific code rate conversion is performed on the reference code rate $\gamma_{ref}$ obtained through MCS table lookup. Therefore, the threshold code rate calculated according to the formula (9) or the formula (10) is also obtained after code rate conversion is performed on the reference code rate $\gamma_{ref}$ obtained through MCS table lookup. Performing specific code rate conversion can make code rate determining more flexible.

In other words, after determining that the uplink shared channel scheduled by using the first DCI is UCI-only, the terminal device may further determine the first code rate by using either of the foregoing two table lookup manners. In this embodiment of this application, the first code rate is the reference code rate $\gamma_{ref}$ obtained through MCS table lookup.

In the first table lookup manner, $I_{MCS}$ in the first DCI is directly used as an index value for a lookup in an MCS table and then the first code rate and the modulation order corresponding to $I_{MCS}$ may be obtained. For example, when $I_{MCS}$ in the first DCI is 16, a first code rate 658 (an actual code rate needs to be obtained by dividing the first code rate by 1024) and a corresponding modulation order 4 may be obtained through a lookup in the MCS table shown in Table 3.

For example, after UCI-only is determined in the foregoing manner 1 or manner 4, the first code rate and the modulation order may be obtained through table lookup in the first table lookup manner.

For example, in the table lookup manner shown in FIG. 4, a bit field including five bits may be constructed based on the HARQ process number and $I_{MCS}$ in the first DCI in the second table lookup manner; then, a value of the created bit field is used as a new index value; and further, the new index value is used as an index value for a lookup in an MCS table, so as to obtain a first code rate and a modulation order that correspond to the new index value. For example, when a value of the created index value is 8, a first code rate 553 (an actual code rate needs to be obtained by dividing the first code rate by 1024) and a corresponding modulation order 4 may be obtained through a lookup in the MCS table shown in FIG. 2.

For example, after UCI-only is determined in the foregoing manner 2 or manner 3, the corresponding first code rate may not be obtained from the MCS table due to a relatively large value of the original $I_{MCS}$ in the first DCI. For example, when $I_{MCS}$ is 31, a corresponding code rate in the MCS table shown in Table 3 is "reserved," that is, the code rate may not be obtained directly. In this case, the second table lookup manner may be used. The created index value is first obtained and then the corresponding first code rate and modulation order are obtained through table lookup based on the created index value.

After the first code rate and the corresponding modulation order are obtained through table lookup, the obtained first code rate and corresponding modulation order may be used to send the UCI, for example, the first UCI, on the uplink shared channel scheduled by using the first DCI.

As described above, the UCI may include the three parts: the HARQ ACK, the CSI-part1, and the CSI-part2. To send each part, a quantity of REs, a code rate, and a modulation order that are used to send the part need to be known. In a specific implementation process, when each part in the UCI is sent, the first code rate obtained through table lookup may be used directly to send related information.

In addition, the existing MCS table is an MCS table in which UL-SCH data is optimized. When the code rate in the MCS table is directly used to indicate a code rate of the UCI on the PUSCH, it is difficult for the network device to implement sufficiently accurate scheduling, that is, accuracy of scheduling by the network device is relatively low. Therefore, to improve accuracy of scheduling by the network device, in this embodiment of this application, after the first code rate is obtained through table lookup, another code rate may be further generated based on the first code rate, that is, the another code rate is obtained by performing conversion on the first code rate, and then the related information of the UCI is sent by using the another code rate.

For ease of understanding by a person skilled in the art, the following describes, by using some examples, how to send information in the UCI by using the first code rate obtained through table lookup. In some examples, the first code rate is directly used to send the information in the UCI, and in some examples, another code rate obtained by performing code rate conversion on the first code rate is used to send the information in the UCI.

(1) For the HARQ ACK included in the DCI, $Q'_{ACK}$ may be calculated according to the formula (1), and then $Q'_{ACK}$ and the first code rate and the modulation order that are obtained through table lookup are used to send a HARQ ACK in the first UCI. In this case, it may be considered that the terminal device sends the HARQ ACK by directly using the first code rate obtained through table lookup.

(2) For the HARQ ACK included in the DCI, $Q'_{ACK}$ may be alternatively calculated by using the first code rate obtained through table lookup and according to the formula (5), and then the calculated $Q'_{ACK}$ and the first code rate and the modulation order that are obtained through table lookup are used to send a HARQ ACK in the first UCI. In this case, it may also be considered that the terminal device sends the HARQ ACK by directly using the first code rate obtained through table lookup.

(3) For the CSI-part1 included in the DCI, $Q'_{CSI-1}$ may be calculated according to the formula (6), and then the calculated $Q'_{CSI-1}$ and the first code rate and the modulation order that are obtained through table lookup are used to send the first UCI. In this case, it may also be considered that the terminal device sends the CSI-part1 by directly using the first code rate obtained through table lookup.

(4) For the CSI-part1 included in the DCI, $Q'_{CSI-1}$ may be first calculated according to the formula (2); a second code rate $\gamma_{CSI-1}$ is calculated by using the first code rate and according to the formula (8); and further, the calculated $Q'_{CSI-1}$ the calculated $\gamma_{CSI-1}$, and the modulation order obtained through table lookup are used to send the first UCI. In this case, it may be considered that the terminal device sends a CSI-part1 in the first UCI by using the second code rate. The process of determining the second code rate $\gamma_{CSI-1}$ by using the first code rate and according to the formula (8) may be understood as the foregoing code rate conversion process. In the following description, a process similar to the process of calculating another code rate based on the first code rate may be understood as the foregoing code rate conversion process.

(5) For the CSI-part1 included in the DCI, $Q'_{CSI-1}$ may be calculated according to the formula (6), and a second code rate $\gamma_{CSI-1}$ is calculated by using the first code rate and according to the formula (8). Because the first code rate $\gamma_{ref}$ is used in the formula (6), using the calculated $Q'_{CSI-1}$, the calculated $\gamma_{CSI-1}$ and the modulation order obtained through table lookup to send the first UCI may be understood as using the first code rate and the second code rate by the terminal device to send the CSI-part1.

(6) For the CSI-part2 included in the DCI, $Q'_{CSI-1}$ may be calculated according to the formula (7), and $\gamma_{CSI-1}$ is calculated based on the first code rate and according to the formula (8); then, a third code rate is calculated by using the calculated $\gamma_{CSI-1}$ and according to the formula (9) or the formula (10); and finally, the calculated $Q'_{CSI-1}$, the calculated third code rate, and the first code rate and the modulation order that are obtained through table lookup are used to send the CSI-part2. Because $\gamma_{CSI-1}$ is the second code rate described above, this may also be understood as using the second code rate and the third code rate to send the CSI-part2.

The third code rate may be understood as the threshold code rate described above. Because the threshold code rate is used to determine, during sending of the CSI-part2 in the UCI, whether some information in the CSI-part2 is to be dropped, the third code rate may be usually used only when the CSI-part2 in the UCI is sent.

The foregoing describes only some possible cases by using examples. In a specific implementation process, certainly, a corresponding part in the first UCI may be sent based on different combinations of the formulas described above and by using different combinations of code rates. Examples are not described one by one in this embodiment of this application. However, the manner of sending the first UCI directly based on the first code rate obtained through table lookup or sending the UCI based on the first code rate obtained through table lookup and by using the another code rate obtained through code rate conversion shall fall within the protection scope of the embodiments of this application.

Based on the same concept, an embodiment of this application further provides a UCI receiving method. The method may be performed by the network device in FIG. 2. For descriptions of corresponding implementations of the method, refer to the foregoing descriptions of the method steps performed by the network device in FIG. 2. Descriptions are not repeated herein. In the method according to this embodiment of this application, the network device may notify, by using UCI, a terminal device of an indication that an uplink shared channel scheduled for the terminal device is used to send only the UCI. This can enhance a capability of the network device to control and indicate to the terminal device, so that the terminal device can have a consistent understanding as the network device, thereby improving performance of interaction between the network device and the terminal device.

In addition, it should be noted that, Chinese explanations of some English terms and English abbreviations are merely examples in this specification. In other words, some English translations in the embodiments of this application are merely example translations. The English translations in this application do not constitute any limitation on meanings of the English terms. Alternatively, it should be understood by a person skilled in the art that, with the development of communications technologies, the English terms or the English abbreviations in the embodiments of this application may further include other Chinese explanations, and all kinds of translations do not affect characteristics of the English terms or the English abbreviations.

Figure 5:
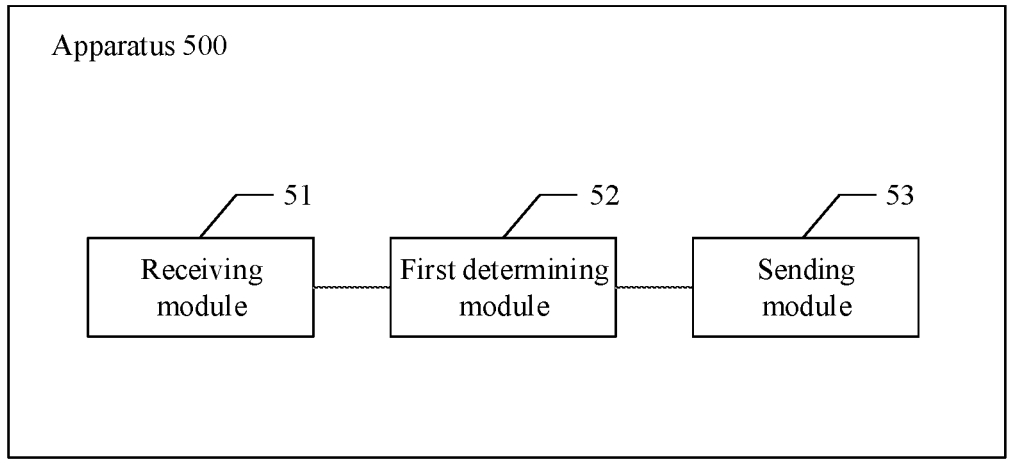
FIG. 5 is a schematic structural diagram of an apparatus according to an embodiment of this application.

Based on the same concept, an embodiment of this application provides an apparatus. FIG. 5 is a schematic structural diagram of an apparatus 500. The apparatus 500 may be a terminal device, and is capable of implementing functions of the terminal device in the method provided in the embodiments of this application. Alternatively, the apparatus 500 may be an apparatus that is capable of supporting a terminal device to implement functions of the terminal device in the method provided in the embodiments of this application. The apparatus 500 may be a hardware structure, a software module, or a combination of a hardware structure and a software module. The apparatus 500 may be implemented by a chip system. In this embodiment of this application, the chip system may include a chip, or may include a chip and another discrete device.

As shown in FIG. 5, the apparatus 500 in this embodiment of this application may include a receiving module 51, a first determining module 52, and a sending module 53.

The receiving module 51 may be configured to receive the first DCI sent by the network device in the embodiment shown in FIG. 2, and may further receive the second DCI sent by the network device; and/or may be further configured to support another process in the technology described in this specification. The second DCI may be previous DCI that carries the same HARQ process number as the first DCI and that is closest to the first DCI in time. The receiving module 51 may be configured for communication between the apparatus in this embodiment of this application and another module, and may be a circuit, a device, an interface, a bus, a software module, a transceiver, or any other apparatus that can implement communication.

The first determining module 52 may be configured to perform step 23 in the embodiment shown in FIG. 2, for example, may determine, based on the first DCI, that the uplink shared channel scheduled by using the first DCI is the channel used to send only the UCI, or may determine, based on the first DCI and the second DCI, that the uplink shared channel scheduled by using the first DCI is the channel used to send only the UCI; and/or may be further configured to support another process in the technology described in this specification. The first determining module 52 may be configured for communication between the apparatus in this embodiment of this application and another module, and may be a circuit, a device, an interface, a bus, a software module, a transceiver, or any other apparatus that can implement communication.

The sending module 53 may be configured to perform step 24 in the embodiment shown in FIG. 2, that is, may send the UCI to the network device through the uplink shared channel scheduled by using the first DCI, for example, send the first UCI; and/or may be configured to support another process in the technology described in this specification. The sending module 53 may be configured for communication between the apparatus in this embodiment of this application and another module and may be a circuit, a device, an interface, a bus, a software module, a transceiver, or any other apparatus that can implement communication.

In a specific implementation process, the receiving module 51 and the sending module 53 may be disposed separately. In this case, the receiving module 51 and the sending module 53 are two independent function modules. In a possible implementation, the receiving module 51 and the sending module 53 may be alternatively integrated into one function module, for example, a transceiver module. The transceiver module has both a capability of the receiving module 51 to receive information and a capability of the sending module 53 to send information.

All related content of each step in the foregoing method embodiments may be cited in function descriptions of a corresponding function module. Details are not described herein again.

Figure 6:
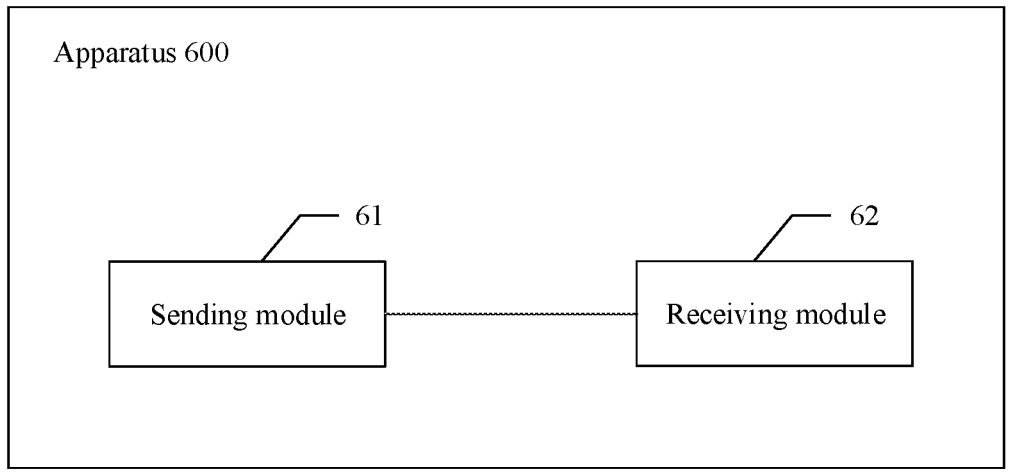
FIG. 6 is a schematic structural diagram of another apparatus according to an embodiment of this application.

Based on the same concept, an embodiment of this application provides an apparatus. FIG. 6 is a schematic structural diagram of an apparatus 600. The apparatus 600 may be a network device and is capable of implementing functions of the network device in the method provided in the embodiments of this application. Alternatively, the apparatus 600 may be an apparatus that is capable of supporting a network device to implement functions of the network device in the method provided in the embodiments of this application. The apparatus 600 may be a hardware structure, a software module, or a combination of a hardware structure and a software module. The apparatus 600 may be implemented by a chip system. In this embodiment of this application, the chip system may include a chip, or may include a chip and another discrete device.

As shown in FIG. 6, the apparatus 600 in this embodiment of this application may include a sending module 61 and a receiving module 62.

The sending module 61 may be configured to perform step 22 in the embodiment shown in FIG. 2, that is, send the first DCI to the terminal device, and may further send the second DCI to the terminal device; and/or may be configured to support another process in the technology described in this specification. The second DCI may be previous DCI that carries the same HARQ process number as the first DCI and that is closest to the first DCI in time. The sending module 61 may be configured for communication between the apparatus in this embodiment of this application and another module, and may be a circuit, a device, an interface, a bus, a software module, a transceiver, or any other apparatus that can implement communication.

The receiving module 62 may be configured to receive the UCI sent by the terminal device in the embodiment shown in FIG. 2, for example, may receive the first DCI sent by the terminal device through the uplink shared channel scheduled by using the first DCI; and/or may be configured to support another process in the technology described in this specification. The receiving module 62 may be configured for communication between the apparatus in this embodiment of this application and another module, and may be a circuit, a device, an interface, a bus, a software module, a transceiver, or any other apparatus that can implement communication.

In addition, the apparatus 600 may further include a determining module. The determining module may perform step 21 in the embodiment shown in FIG. 2, that is, may determine that the uplink shared channel scheduled for the terminal device is used to send only the UCI.

In a specific implementation process, the sending module 61 and the receiving module 62 may be disposed separately. In this case, the sending module 61 and the receiving module 62 are two independent function modules. In a possible implementation, the sending module 61 and the receiving module 62 may be alternatively integrated into one function module, for example, a transceiver module. The transceiver module has both a capability of the receiving module 51 to send information and a capability of the receiving module 62 to receive information.

All related content of each step in the foregoing method embodiments may be cited in function descriptions of a corresponding function module. Details are not described herein again.

In this embodiment of this application, module division is an example, and is merely logical function division and may be another division manner during actual implementation. In addition, function modules in the embodiments of this application may be integrated into one processor, or each of the modules may exist alone physically, or at least two modules may be integrated into one module. The integrated module may be implemented in a form of hardware, or may be implemented in a form of a software function module.

Figure 7:
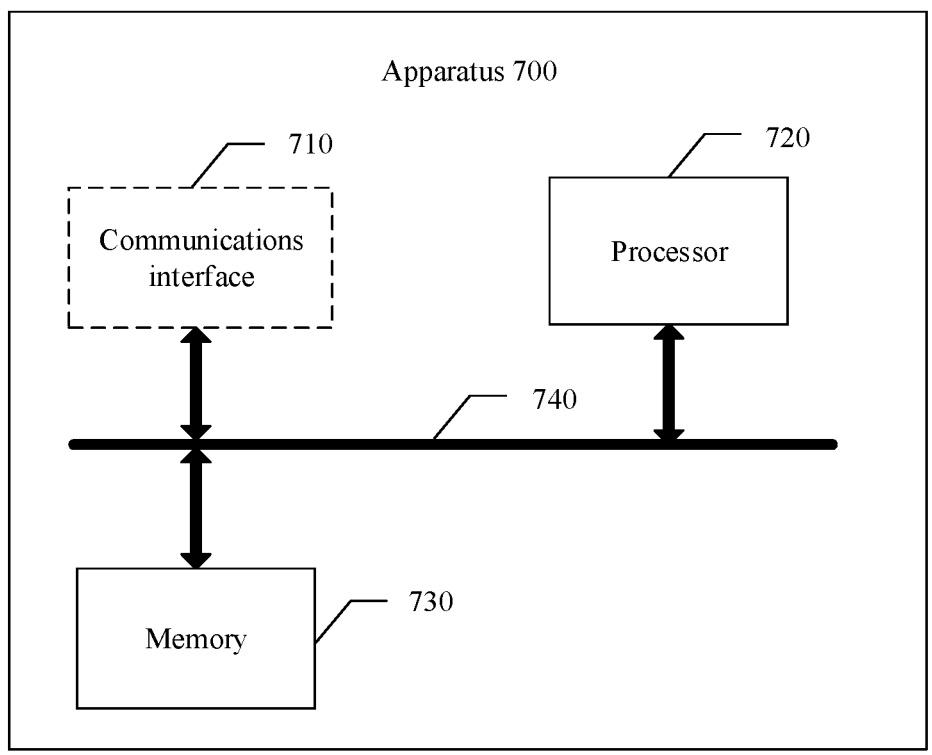
FIG. 7 is a schematic structural diagram of another apparatus according to an embodiment of this application.

Based on the same concept, an embodiment of this application provides an apparatus. FIG. 7 is a schematic structural diagram of an apparatus 700 according to an embodiment of this application. The apparatus 700 may be a terminal device, and is capable of implementing functions of the terminal device in the method provided in the embodiments of this application. Alternatively, the apparatus 700 may be an apparatus that is capable of supporting a terminal device to implement functions of the terminal device in the method provided in the embodiments of this application. The apparatus 700 may be a chip system. In this embodiment of this application, the chip system may include a chip, or may include a chip and another discrete device.

The apparatus 700 includes at least one processor 720, configured to implement or support the apparatus to implement functions of the terminal device in the method provided in the embodiments of this application. For example, the processor 720 may process information, for example, may correspond to the first determining module 52 in the apparatus 500 shown in FIG. 5. For example, the processor 720 may determine, based on the obtained first DCI, that the uplink shared channel scheduled by using the first DCI is used to send only the UCI. For details, refer to the detailed descriptions in the method example. Details are not described herein again.

The apparatus 700 may further include at least one memory 730, configured to store a program instruction and/or data. The memory 730 is coupled to the processor 720. Couplings in this embodiment of this application are indirect couplings or communication connections between apparatuses, units, or modules, may be electrical, mechanical, or in another form, and are used for information exchange between the apparatuses, the units, or the modules. The processor 720 may cooperate with the memory 730. The processor 720 may execute the program instruction stored in the memory 730. At least one of the at least one memory may be included in the processor.

The apparatus 700 may further include a communications interface 710, configured to communicate with another device through a transmission medium, so that an apparatus in the apparatus 700 can communicate with the another device. The processor 720 may transmit and send data through the communications interface 710. For example, the communications interface 710 may correspond to the receiving module 51 and the sending module 53 in FIG. 5.

A specific connection medium between the communications interface 710, the processor 720, and the memory 730 is not limited in this embodiment of this application. In this embodiment of this application, the memory 730, the processor 720, and the communications interface 710 are connected by using a bus 740 in FIG. 7, where the bus is represented by a bold line in FIG. 7. This is only a schematic illustration and is not intended for limitation. There may be other connection manners between the components. The bus may be classified into an address bus, a data bus, a control bus, and the like. For ease of representation, only one bold line is used to represent the bus in FIG. 7, but this does not mean that there is only one bus or only one type of bus.

In this embodiment of this application, the processor 720 may be a general-purpose processor, a digital signal processor, an application-specific integrated circuit, a field programmable gate array or another programmable logic device, a discrete gate or transistor logic device, or a discrete hardware component and may implement or execute the methods, steps, and logical block diagrams disclosed in the embodiments of this application. The general-purpose processor may be a microprocessor or any conventional processor or the like. The steps of the method disclosed with reference to the embodiments of this application may be directly performed by a hardware processor, or may be performed by using a combination of hardware in the processor and a software module.

In this embodiment of this application, the memory 730 may be a nonvolatile memory, for example, a hard disk drive (HDD) or a solid-state drive (SSD); or may be a volatile memory, for example, a random-access memory (RAM). The memory is any other medium that can be used to carry or store expected program code in a form of an instruction or a data structure and that is accessible to a computer, but is not limited thereto. The memory in this embodiment of this application may alternatively be a circuit or any other apparatus that is capable of implementing a storage function, and is configured to store a program instruction and/or data.

Figure 8:
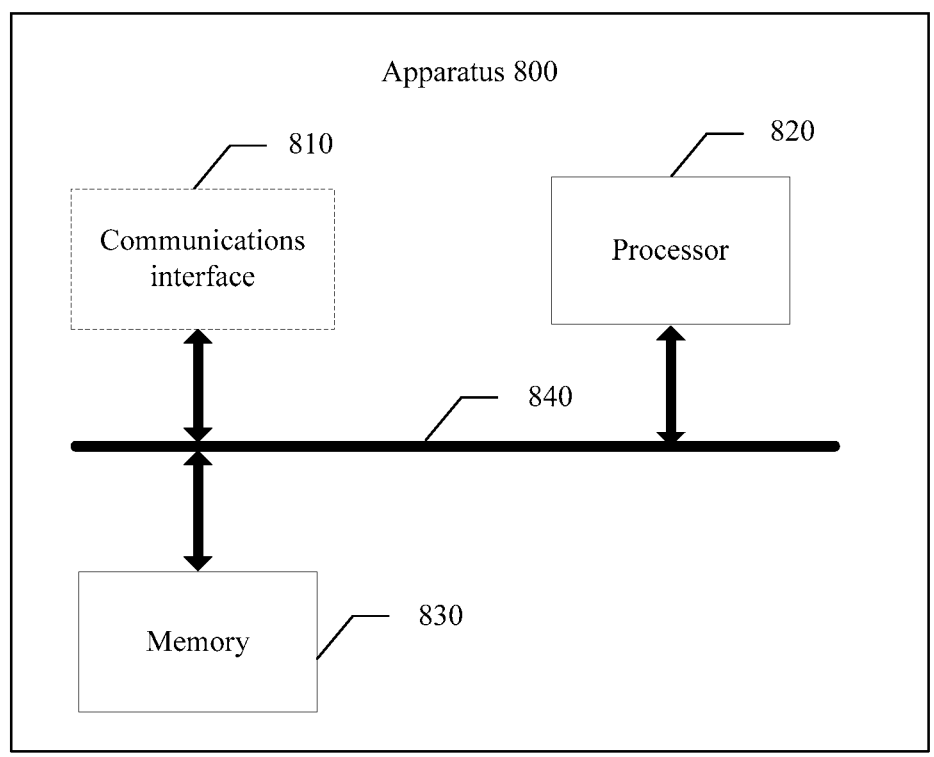
FIG. 8 is a schematic structural diagram of another apparatus according to an embodiment of this application.

Based on the same concept, an embodiment of this application provides another apparatus. FIG. 8 is a schematic structural diagram of another apparatus 800 according to an embodiment of this application. The apparatus 800 may be a network device and is capable of implementing functions of the network device in the method provided in the embodiments of this application. Alternatively, the apparatus 800 may be an apparatus that is capable of supporting a network device to implement functions of the network device in the method provided in the embodiments of this application. The apparatus 800 may be a chip system. In this embodiment of this application, the chip system may include a chip, or may include a chip and another discrete device.

The apparatus 800 includes at least one processor 820, configured to implement or support the apparatus to implement functions of the terminal device in the method provided in the embodiments of this application. For example, the processor 820 corresponds to the determining module in the embodiment shown in FIG. 6. For example, the processor 820 determines that the uplink shared channel scheduled for the terminal device is the channel used to send only the UCI. For details, refer to the detailed descriptions in the method example. Details are not described herein again.

The apparatus 800 may further include at least one memory 830, configured to store a program instruction and/or data. The memory 830 is coupled to the processor 820. Couplings in this embodiment of this application are indirect couplings or communication connections between apparatuses, units, or modules, may be electrical, mechanical, or in another form, and are used for information exchange between the apparatuses, the units, or the modules. The processor 820 may cooperate with the memory 830. The processor 820 may execute the program instruction stored in the memory 830. At least one of the at least one memory may be included in the processor.

The apparatus 800 may further include a communications interface 810, configured to communicate with another device through a transmission medium, so that an apparatus in the apparatus 800 can communicate with the another device. The processor 820 may transmit and send data through the communications interface 810. For example, the communications interface 810 may correspond to the sending module 61 and the receiving module 62 in FIG. 6.

A specific connection medium between the communications interface 810, the processor 820, and the memory 830 is not limited in this embodiment of this application. In this embodiment of this application, the memory 830, the processor 820, and the communications interface 810 are connected by using a bus 840 in FIG. 8, where the bus is represented by a bold line in FIG. 8. This is only a schematic illustration and is not intended for limitation. There may be other connection manners between the components. The bus may be classified into an address bus, a data bus, a control bus, and the like. For ease of representation, only one bold line is used to represent the bus in FIG. 8, but this does not mean that there is only one bus or only one type of bus.

In this embodiment of this application, the processor 820 may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general-purpose processor may be a microprocessor or any conventional processor or the like. The steps of the method disclosed with reference to the embodiments of this application may be directly performed by a hardware processor, or may be performed by using a combination of hardware in the processor and a software module.

In this embodiment of this application, the memory 830 may be a nonvolatile memory, for example, an HDD or a solid-state drive SSD; or may be a volatile memory, for example, a random-access memory RAM. The memory is any other medium that can be used to carry or store expected program code in a form of an instruction or a data structure and that is accessible to a computer, but is not limited thereto. The memory in this embodiment of this application may alternatively be a circuit or any other apparatus that is capable of implementing a storage function, and is configured to store a program instruction and/or data.

An embodiment of this application further provides a readable storage medium including an instruction. When run on a computer, the instruction enables the computer to perform the steps that are performed by the terminal device in the method shown in FIG. 2.

An embodiment of this application further provides a readable storage medium including an instruction. When run on a computer, the instruction enables the computer to perform the steps that are performed by the network device in the method shown in FIG. 2.

An embodiment of this application provides a chip system. The chip system includes a processor, may further include a memory, and is configured to implement functions of the terminal device in the foregoing method. The chip system may include a chip, or may include a chip and another discrete device.

An embodiment of this application provides a chip system. The chip system includes a processor, may further include a memory, and is configured to implement functions of the network device in the foregoing method. The chip system may include a chip, or may include a chip and another discrete device.

An embodiment of this application provides a system. The system includes the foregoing network device and the foregoing terminal device.

In a possible implementation, the aspects of the methods in the embodiments of this application may be alternatively implemented in a form of a program product. The program product includes program code and when the program product is run on the terminal device or the network device, the program code is used to enable the terminal device or the network device to perform the steps of the methods according to various foregoing example embodiments in this specification.

All or some of the methods in the embodiments of this application may be implemented by using software, hardware, firmware, or any combination thereof. When software is used for implementation, the methods may be implemented completely or partially in a form of a computer program product. The computer program product includes one or more computer instructions. When the computer program instruction is loaded and executed on a computer, the procedure or functions according to the embodiments of the present invention are all or partially generated. The computer may be a general-purpose computer, a special-purpose computer, a computer network, a network device, user equipment, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

The foregoing embodiments are merely used to describe the technical solutions in this application. The foregoing embodiments are merely intended to help understand the method and core idea of the present invention, and shall not be construed as a limitation on the present invention. Any variation or replacement readily figured out by a person skilled in the art within the technical scope disclosed in the present invention shall fall within the protection scope of the present invention.

Obviously, a person skilled in the art can make various modifications and variations to this application without departing from the scope of this application. This application is intended to cover these modifications and variations of this application provided that they fall within the scope defined by the following claims and their equivalent technologies.

What is claimed is:

1. An uplink control information sending method, comprising:
    receiving first downlink control information from a network device, wherein the first downlink control information is used to schedule a physical uplink shared channel (PUSCH);
    determining, based on the first downlink control information, that the PUSCH is not used to send uplink shared channel (UL-SCH) data; and
    sending first uplink control information to the network device through the PUSCH, wherein the first uplink control information comprises a hybrid automatic repeat request-acknowledgement, a first part of channel state information, and a second part of the channel state information, wherein:
    a total quantity of resource elements that are in the PUSCH and are used to carry the first uplink control information is M,
    a quantity of resource elements that are in the PUSCH and used to carry the hybrid automatic repeat request-acknowledgement is a minimum value of a first quantity and the total quantity M, wherein the first quantity is equal to a round-up value of a ratio of a first product to a second product, wherein the first product is a product of a payload size of the hybrid automatic repeat request-acknowledgement and a code rate compensation parameter of the hybrid automatic repeat request-acknowledgement, and the second product is a product of a first code rate and a modulation order, and
    a quantity of resource elements that are in the PUSCH and are used to carry the first part of the channel state information is a minimum value of a second quantity and a remaining quantity, wherein the remaining quantity is equal to the total quantity M minus the quantity of the resource elements that are in the PUSCH and are used to carry the hybrid automatic repeat request-acknowledgement, and the second quantity is equal to a round-up value of a ratio of a third product to the second product, wherein the third product is a product of a payload size of the first part of the channel state information and a code rate compensation parameter of the first part of the channel state information.

2. The method according to claim 1, wherein a quantity of resource elements that are in the PUSCH and are used to carry the second part of the channel state information is equal to the total quantity M minus the quantity of the resource elements that are in the PUSCH and are used to carry the hybrid automatic repeat request-acknowledgement and minus the quantity of the resource elements that are in the PUSCH and are used to carry the first part of the channel state information.

3. The method according to claim 1, wherein the first code rate and the modulation order are determined based on a modulation and coding scheme index comprised in the first downlink control information.

4. The method according to claim 3, wherein
a correspondence among the modulation and coding scheme index, the first code rate, and the modulation order meets a correspondence defined in one of the following tables:

TABLE 1

| MCS index | Modulation order | Target code rate × 1024 | Spectrum efficiency |
| --- | --- | --- | --- |
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |

TABLE 1-continued

| MCS index | Modulation order | Target code rate × 1024 | Spectrum efficiency |
|---|---|---|---|
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | | Reserved |
| 30 | 4 | | Reserved |
| 31 | 6 | | Reserved |

TABLE 2

| MCS index | Modulation order | Target code rate × 1024 | Spectrum efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | | Reserved |
| 29 | 4 | | Reserved |
| 30 | 6 | | Reserved |
| 31 | 8 | | Reserved |

TABLE 3

| MCS index | Modulation order | Target code rate × 1024 | Spectrum efficiency |
|---|---|---|---|
| 0 | q | 240/q | 0.2344 |
| 1 | q | 314/q | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | 1 | | Reserved |
| 29 | 2 | | Reserved |
| 30 | 4 | | Reserved |
| 31 | 6 | | Reserved. |

5. The method according to claim 1, wherein
a code rate of the second part of the channel state information is not higher than a threshold code rate; or
a code rate of the second part of the channel state information is higher than a threshold code rate, and a portion of the second part of the channel state information is discarded based on a priority, wherein
the threshold code rate is a ratio of the first code rate to a code rate compensation parameter of the second part of the channel state information.

6. An apparatus, comprising: one or more processors, and one or more computer-readable storage media storing program instructions; wherein, when executed by the one or more processors, the instructions cause the apparatus to:
receive first downlink control information from a network device, wherein the first downlink control information is used to schedule a physical uplink shared channel (PUSCH);
determine, based on the first downlink control information, that the PUSCH is not used to send uplink shared channel (UL-SCH) data; and
send first uplink control information to the network device through the PUSCH, wherein the first uplink control information comprises a hybrid automatic repeat request-acknowledgement, a first part of channel state information, and a second part of the channel state information, wherein:
a total quantity of resource elements that are in the PUSCH and are used to carry the first uplink control information is M,
a quantity of resource elements that are in the PUSCH and are used to carry the hybrid automatic repeat request-acknowledgement is a minimum value of a first quantity and the total quantity M, wherein the first quantity is equal to a round-up value of a ratio of a first product to a second product, wherein the first product is a product of a payload size of the hybrid automatic repeat request-acknowledgement and a code rate compensation parameter of the hybrid automatic repeat request-acknowledgement, and the second product is a product of a first code rate and a modulation order, and
a quantity of resource elements that are in the PUSCH and are used to carry the first part of the channel state information is a minimum value of a second quantity and a remaining quantity, wherein the remaining quantity is equal to the total quantity M minus the quantity of the resource elements that are in the PUSCH and are used to carry the hybrid automatic repeat request-acknowledgement, and the second quantity is equal to a round-up value of a ratio of a third product to the second product, wherein the third product is a product of a payload size of the first part of the channel state information and a code rate compensation parameter of the first part of the channel state information.

7. The apparatus according to claim 6, wherein a quantity of resource elements that are in the PUSCH and are used to carry the second part of the channel state information is equal to the total quantity M of the resource elements minus the quantity of the resource elements that are in the PUSCH and are used to carry the hybrid automatic repeat request-acknowledgement and minus the quantity of the resource elements that are in the PUSCH and are used to carry the first part of the channel state information.

8. The apparatus according to claim 6, wherein the first code rate and the modulation order are determined based on a modulation and coding scheme index comprised in the first downlink control information.

9. The apparatus according to claim 8, wherein
a correspondence among the modulation and coding scheme index, the first code rate, and the modulation order meets a correspondence defined in one of the following tables:

TABLE 1

| MCS index | Modulation order | Target code rate × 1024 | Spectrum efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | Reserved | |
| 30 | 4 | Reserved | |
| 31 | 6 | Reserved | |

TABLE 2

| MCS index | Modulation order | Target code rate × 1024 | Spectrum efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | Reserved | |
| 29 | 4 | Reserved | |
| 30 | 6 | Reserved | |
| 31 | 8 | Reserved | |

TABLE 3

| MCS index | Modulation order | Target code rate × 1024 | Spectrum efficiency |
|---|---|---|---|
| 0 | q | 240/q | 0.2344 |
| 1 | q | 314/q | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | 1 | Reserved | |
| 29 | 2 | Reserved | |
| 30 | 4 | Reserved | |
| 31 | 6 | Reserved. | |

10. The apparatus according to claim 6, wherein
a code rate of the second part of the channel state information is not higher than a threshold code rate; or
a code rate of the second part of the channel state information is higher than a threshold code rate, and a portion of the second part of the channel state information is discarded based on a priority, wherein
the threshold code rate is a ratio of the first code rate to a code rate compensation parameter of the second part of the channel state information.

11. An uplink control information receiving method, comprising:
   sending first downlink control information to a terminal device, wherein the first downlink control information is used to schedule a physical uplink shared channel (PUSCH), and the first downlink control information indicates that the PUSCH is not used to send uplink shared channel (UL-SCH)-data; and
   receiving, through the PUSCH, first uplink control information sent by the terminal device, wherein the first uplink control information comprises a hybrid automatic repeat request-acknowledgement, a first part of channel state information, and a second part of the channel state information, wherein
   a total quantity of resource elements that are in the PUSCH and are used to carry the first uplink control information is M, and a quantity of resource elements that are in the PUSCH and are used to carry the hybrid automatic repeat request-acknowledgement is a minimum value of a first quantity and the total quantity M, wherein the first quantity is equal to a round-up value of a ratio of a first product to a second product, wherein the first product is a product of a payload size of the hybrid automatic repeat request-acknowledgement and a code rate compensation parameter of the hybrid automatic repeat request-acknowledgement, and the second product is a product of a first code rate and a modulation order, and
   a quantity of resource elements that are in the PUSCH and are used to carry the first part of the channel state information is a minimum value of a second quantity and a remaining quantity, wherein the remaining quantity is equal to the total quantity M minus the quantity of the resource elements that are in the PUSCH and are used to carry the hybrid automatic repeat request-acknowledgement, and the second quantity is equal to a round-up value of a ratio of a third product to the second product, wherein the third product is a product of a payload size of the first part of the channel state information and a code rate compensation parameter of the first part of the channel state information.

12. The method according to claim 11, wherein a quantity of resource elements that are in the PUSCH and are used to carry the second part of the channel state information is equal to the total quantity M minus the quantity of the resource elements that are in the PUSCH and are used to carry the hybrid automatic repeat request-acknowledgement and minus the quantity of the resource elements that are in the PUSCH and are used to carry the first part of the channel state information.

13. The method according to claim 11, wherein the first code rate and the modulation order are determined based on a modulation and coding scheme index comprised in the first downlink control information.

14. The method according to claim 13, wherein a correspondence among the modulation and coding scheme index, the first code rate, and the modulation order meets a correspondence defined in one of the following tables:

TABLE 1

| MCS index | Modulation order | Target code rate × 1024 | Spectrum efficiency |
|---|---|---|---|
| 0 | 2 | 120 | 0.2344 |
| 1 | 2 | 157 | 0.3066 |
| 2 | 2 | 193 | 0.3770 |

TABLE 1-continued

| MCS index | Modulation order | Target code rate × 1024 | Spectrum efficiency |
|---|---|---|---|
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | Reserved | |
| 30 | 4 | Reserved | |
| 31 | 6 | Reserved | |

TABLE 2

| MCS index | Modulation order | Target code rate × 1024 | Spectrum efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | Reserved | |
| 29 | 4 | Reserved | |
| 30 | 6 | Reserved | |
| 31 | 8 | Reserved | |

TABLE 3

| MCS index | Modulation order | Target code rate × 1024 | Spectrum efficiency |
|---|---|---|---|
| 0 | q | 240/q | 0.2344 |
| 1 | q | 314/q | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | 1 | | Reserved |
| 29 | 2 | | Reserved |
| 30 | 4 | | Reserved |
| 31 | 6 | | Reserved. |

15. An apparatus, comprising: one or more processors, and one or more computer-readable storage media storing program instructions; wherein, when executed by the one or more processors, the instructions cause the apparatus to:
    send first downlink control information to a terminal device, wherein the first downlink control information is used to schedule a physical uplink shared channel (PUSCH), and the first downlink control information indicates that the PUSCH is used to send PUSCH (UL-SCH)-data; and
    receive, through the PUSCH, first uplink control information sent by the terminal device, wherein the first uplink control information comprises a hybrid automatic repeat request-acknowledgement, a first part of channel state information, and a second part of the channel state information, wherein
    a total quantity of resource elements that are in the PUSCH and are used to carry the first uplink control information is M, and a quantity of resource elements that are in the PUSCH and are used to carry the hybrid automatic repeat request-acknowledgement is a minimum value of a first quantity and the total quantity M, wherein the first quantity is equal to a round-up value of a ratio of a first product to a second product, wherein the first product is a product of a payload size of the hybrid automatic repeat request-acknowledgement and a code rate compensation parameter of the hybrid automatic repeat request-acknowledgement, and the second product is a product of a first code rate and a modulation order, and
    a quantity of resource elements that are in the PUSCH and are used to carry the first part of the channel state information is a minimum value of a second quantity and a remaining quantity, wherein the remaining quantity is equal to the total quantity M minus the quantity of the resource elements that are in the PUSCH and are used to carry the hybrid automatic repeat request-acknowledgement, and the second quantity is equal to a round-up value of a ratio of a third product to the second product, wherein the third product is a product of a payload size of the first part of the channel state information and a code rate compensation parameter of the first part of the channel state information, and the second product is a product of the first code rate and the modulation order.

16. The apparatus according to claim 15, wherein a quantity of resource elements that are in the PUSCH and are used to carry the second part of the channel state information is equal to the total quantity M of the resource elements minus the quantity of the resource elements that are in the PUSCH and are used to carry the hybrid automatic repeat request-acknowledgement and minus the quantity of the resource elements that are in the PUSCH and are used to carry the first part of the channel state information.

17. The apparatus according to claim 15, wherein the first code rate and the modulation order are determined based on a modulation and coding scheme index comprised in the first downlink control information.

18. The apparatus according to claim 17, wherein a correspondence among the modulation and coding scheme index, the first code rate, and the modulation order meets a correspondence defined in one of the following tables:

TABLE 1

| MCS index | Modulation order | Target code rate × 1024 | Spectrum efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | | Reserved |
| 30 | 4 | | Reserved |
| 31 | 6 | | Reserved |

TABLE 2

| MCS index | Modulation order | Target code rate × 1024 | Spectrum efficiency |
|---|---|---|---|
| 0 | 2 | 120 | 0.2344 |
| 1 | 2 | 193 | 0.3770 |

TABLE 2-continued

| MCS index | Modulation order | Target code rate × 1024 | Spectrum efficiency |
|---|---|---|---|
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | Reserved | |
| 29 | 4 | Reserved | |
| 30 | 6 | Reserved | |
| 31 | 8 | Reserved | |

TABLE 3

| MCS index | Modulation order | Target code rate × 1024 | Spectrum efficiency |
|---|---|---|---|
| 0 | q | 240/q | 0.2344 |
| 1 | q | 314/q | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | 1 | Reserved | |
| 29 | 2 | Reserved | |
| 30 | 4 | Reserved | |
| 31 | 6 | Reserved. | |

* * * * *

UNITED STATES PATENT AND TRADEMARK OFFICE
CERTIFICATE OF CORRECTION

PATENT NO. : 11,483,854 B2
APPLICATION NO. : 17/062208
DATED : October 25, 2022
INVENTOR(S) : Hao Sun et al.

It is certified that error appears in the above-identified patent and that said Letters Patent is hereby corrected as shown below:

On the Title Page

Item (57) ABSTRACT, Line 1, delete "an" and insert -- and --.

In the Claims

In Column 43, Line 41 (Approx.), in Claim 15, delete "is used" and insert -- is not used --.

Signed and Sealed this
Twenty-fifth Day of April, 2023

Katherine Kelly Vidal
*Director of the United States Patent and Trademark Office*